(12) United States Patent
Nakashima et al.

(10) Patent No.: US 11,684,985 B2
(45) Date of Patent: Jun. 27, 2023

(54) PORTABLE CUTTING MACHINE

(71) Applicant: MAKITA CORPORATION, Anjo (JP)

(72) Inventors: Tatsuo Nakashima, Anjo (JP); Kenji Nose, Anjo (JP); Takuji Kimura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 163 days.

(21) Appl. No.: 16/969,445

(22) PCT Filed: Feb. 19, 2019

(86) PCT No.: PCT/JP2019/006025
§ 371 (c)(1),
(2) Date: Aug. 12, 2020

(87) PCT Pub. No.: WO2019/167716
PCT Pub. Date: Sep. 6, 2019

(65) Prior Publication Data
US 2021/0001418 A1     Jan. 7, 2021

(30) Foreign Application Priority Data

Feb. 27, 2018   (JP) .............................. JP2018-033494

(51) Int. Cl.
*B23D 45/16*      (2006.01)
*B25F 5/02*       (2006.01)
*B27G 19/04*      (2006.01)

(52) U.S. Cl.
CPC ................ *B23D 45/16* (2013.01); *B25F 5/02* (2013.01); *B27G 19/04* (2013.01)

(58) Field of Classification Search
CPC ........ B23D 45/16; B23D 47/00; B27G 19/04; B27B 9/00

(Continued)

(56) References Cited

U.S. PATENT DOCUMENTS 4,787,145 A * 11/1988 Klicker ..................... B27B 9/00
30/388
4,895,336 A *  1/1990 Lieberman ............. B25H 3/006
30/388

(Continued)

FOREIGN PATENT DOCUMENTS

CN        2838242 Y      11/2006
CN      101234513 A       8/2008

(Continued)

OTHER PUBLICATIONS

May 28, 2019 Search Report issued in International Patent Application No. PCT/JP2019/006025.

(Continued)

*Primary Examiner* — Nhat Chieu Q Do

(74) *Attorney, Agent, or Firm* — Oliff PLC

(57) ABSTRACT

A suspending member, such as a tether strap or the like, may by connected to improve convenience for an operator. The function of the suspending member shall be reliably performed by clearly notifying the user when the connecting part for connecting the suspending member is damaged. A ring-shaped notification member is incorporated in a connecting part for connecting the suspending member. The suspending member is inserted into both of a connecting hole in a connecting part and a notification member so as to be connected. When an end of a handle portion breaks due to long-term use, the notification member is pulled out such that the damage of the connecting part is notified.

8 Claims, 25 Drawing Sheets

(58) Field of Classification Search
USPC .......................................................... 30/388
See application file for complete search history.

(56) References Cited

U.S. PATENT DOCUMENTS

| | | | | |
|---|---|---|---|---|
| 5,330,138 | A | * | 7/1994 | Schlessmann .......... B25F 5/029 248/316.2 |
| 5,850,698 | A | * | 12/1998 | Hum ........................ B27B 9/00 30/377 |
| 2006/0108387 | A1 | | 5/2006 | Nakaya et al. |
| 2009/0086440 | A1 | | 4/2009 | Takahama |
| 2011/0162219 | A1 | | 7/2011 | Okouchi |
| 2011/0289786 | A1 | | 12/2011 | Bijsterveldt et al. |
| 2012/0261444 | A1 | | 10/2012 | Hoche et al. |
| 2015/0266201 | A1 | * | 9/2015 | Nakashima ............... B27B 9/02 30/374 |
| 2017/0021490 | A1 | * | 1/2017 | Francis .................. A61K 47/58 |
| 2017/0189976 | A1 | | 7/2017 | Lin et al. |
| 2018/0132600 | A1 | * | 5/2018 | Moreau .................. A45C 13/30 |
| 2018/0156385 | A1 | * | 6/2018 | Giglio ....................... B25F 5/02 |

FOREIGN PATENT DOCUMENTS

| | | |
|---|---|---|
| CN | 101404860 A | 4/2009 |
| CN | 102726163 A | 10/2012 |
| CN | 107443320 A | 12/2017 |
| JP | S58-122802 A | 7/1983 |
| JP | S59-5303 U | 1/1984 |
| JP | 2006-326753 A | 12/2006 |
| JP | 2009-88366 A | 4/2009 |
| JP | 2011-136541 A | 7/2011 |
| JP | 2012-513906 A | 6/2012 |
| JP | 2015-178154 A | 10/2015 |
| JP | 2017-532211 A | 11/2017 |

OTHER PUBLICATIONS

May 28, 2019 Written Opinion of the International Searching Authority issued in International Patent Application No. PCT/JP2019/006025.

Feb. 2, 2021 Office Action issued in Japanese Patent Application No. 2018-033494.

Aug. 31, 2022 Office Action issued in Chinese Patent Application No. 2019800153722.

Feb. 25, 2023 Office Action issued in Chinese Patent Application No. 201980015372.2.

* cited by examiner

PORTABLE CUTTING MACHINE

CROSS-REFERENCE TO RELATED APPLICATIONS

The present application is a U.S. National Phase entry of, and claims priority to, PCT Application No. PCT/JP2019/006025, filed Feb. 19, 2019, which claims priority to Japanese Patent Application No. 2018-033494, filed Feb. 27, 2018, both of which are incorporated herein by reference in their entireties for all purposes.

BACKGROUND

The present disclosure relates to a portable cutting machine for performing a cutting process, as an operator holds and moves the portable cutting machine with his/her hand.

Japanese Laid-Open Patent Publication No. 2006-326753 and Japanese Laid-Open Patent Publication No. 2015-178154 disclose a portable cutting machine of this type and are provided with a hook to be hooked to a separate component. The cutting machine can be hung by hooking a suspending part of this hook, etc. to, for example, a scaffold or a handrail or the like in a work place.

Although the hook could be easily hung on a horizontally extending bar material of a double-end supported beam, there was still room for improvement when the hook is to be hung on a bar material of a cantilever beam extending upward. Alternative to this, conventionally, a suspending member, such as a tether strap, etc., was connected to a cutting machine so as to be suspended.

Conventionally, a connecting part of the suspending member may be damaged due to long-term use, etc. As a result, a suspending function may not be performed sufficiently. In this case, sufficient measures would not have been taken to prevent the use of the suspending member by an operator, who has not been made aware of this damage.

The present embodiment relates mainly to a portable cutting machine. One of the objects is to ensure an original function of a suspending member may be performed, for instance by notifying an operator when a connecting part for connecting a suspending member, which functions for falling-down prevention, is damaged, etc.

BRIEF SUMMARY

The above problem can be solved by each of the following aspects. A first aspect is a portable cutting machine configured to perform a cutting process by allowing a rotary cutting tool, which is rotated by an electric motor as a drive source, to cut into a cutting material. According to the first aspect, a portable cutting machine includes a suspending part to be suspended by a separate component. According to the first aspect, the suspending part is configured to have a suspending member, a connecting part to which the suspending member is connected, and a notification member configured to notify that the connecting part is deformed, for instance by an external force.

According to the first aspect, when the connecting part is deformed due to damage etc., an operator or a user is notified of this event by a notification member. An operator can therefore recognize that the proper functionality may not be reliably performed if the operator keeps using the suspending part as it is. Therefore, after he/she repaired the damage at the connecting part, the falling-down prevention function can be reliably performed, so as to allow the operator to continuously use the suspending part.

A second aspect is the portable cutting machine of the first aspect, further including a handle portion extending in a frontward/rearward direction along a rotary cutting tool, and a suspending part behind the handle portion.

According to the second aspect, the suspending part will not interfere with the user when the handle portion is held, and thus deterioration in operability can be prevented even if the suspending member is present.

A third aspect is the portable cutting machine according to the first or second aspect, in addition to one or both of the connecting part and the notification member having a connecting hole(s) through which the suspending member is inserted.

According to the third aspect, the suspending member is inserted into a connecting hole(s) in one or both of the connecting part and the notification member, thereby the suspending member is engaged with the connecting part or the notification member.

A fourth aspect is the portable cutting machine according the third aspect, in addition to the suspending member being inserted through an inner peripheral side of the notification member and the connecting hole(s), so as to be connected to the connecting part.

According to the fourth aspect, the suspending member is inserted into the inner peripheral side (connecting hole) of the notification member, and surrounds the periphery of the connecting member so as to be connected to the connecting part.

A fifth aspect is the portable cutting machine according to the third or fourth aspect, further comprising a ring-shaped wire that is used as a notification member.

According to the fifth aspect, the suspending member is inserted through the inner peripheral side of the notification member (ring-shaped wire) so as to be connected to the connecting part.

A sixth aspect is the portable cutting machine according to the third or the fourth aspect, further comprising a U-shaped connecting hole along a periphery of the connecting part as a connecting hole. The suspending member is inserted through the connecting hole, so as to be connected to the connecting part.

According to the sixth aspect, the suspending member is inserted into the connecting hole of the connecting part and connected to the connecting part.

A seventh aspect is the portable cutting machine according to any one of the first to sixth aspects, further includes that the notification member is pulled by the suspending member and moves to notify the deformation of the connecting part when the connecting part is deformed by an external force.

According to the seventh aspect, the notification member hooked by the suspending member moves to notify a user, etc. of deformation at the connecting part, when the connecting part is deformed due to the damage, etc. The user, etc. may visually observe the change in position of the notification member, in order to confirm that the suspending part has been damaged, or the like. By suspending the use of the damaged suspending part, it is possible to avoid a state in which the original function of the suspending part is not sufficiently performed.

DETAILED DESCRIPTION

Figure 1:
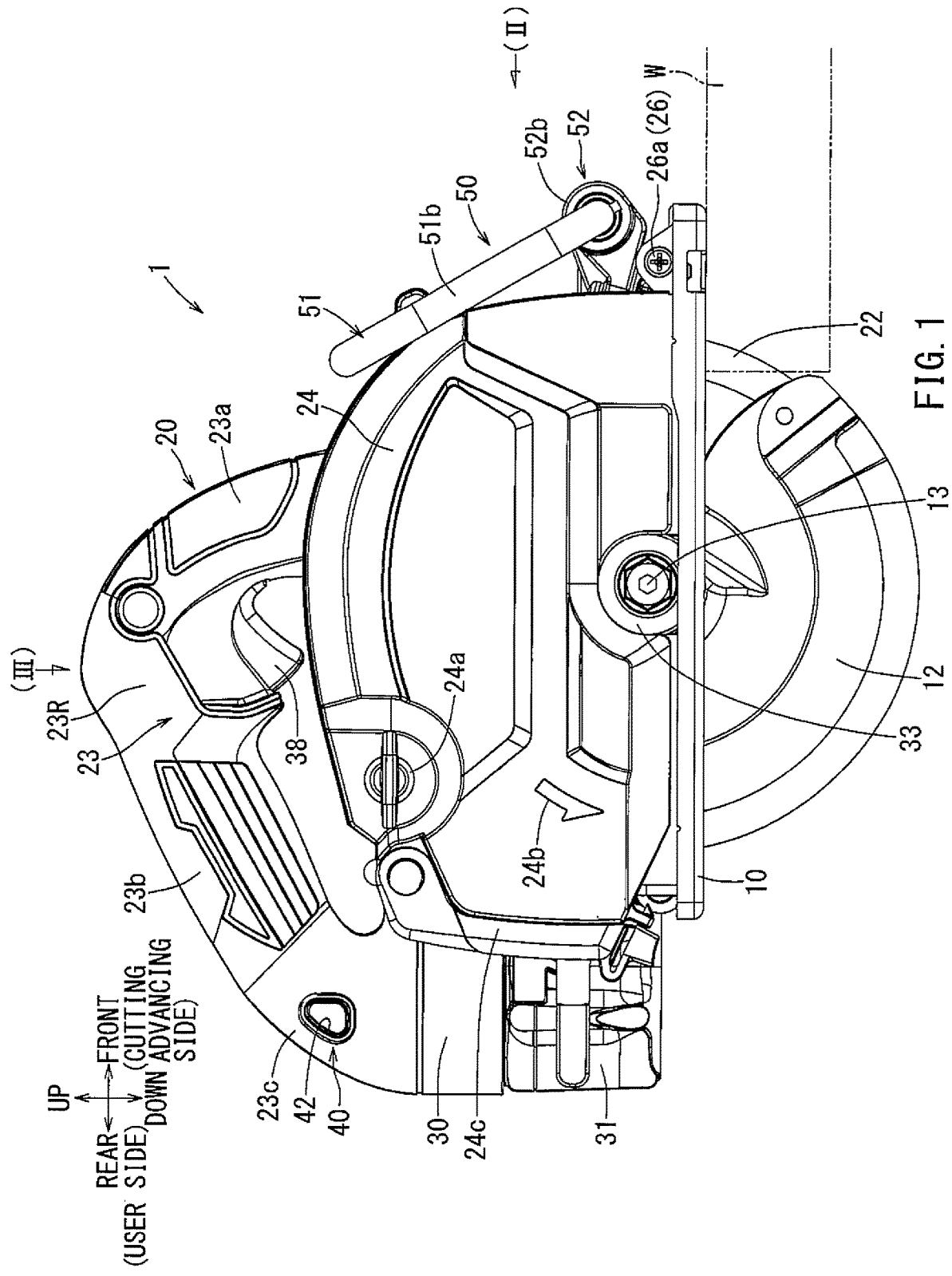
FIG. 1 is a right side view of a portable cutting machine according to a first embodiment.
Figure 2:
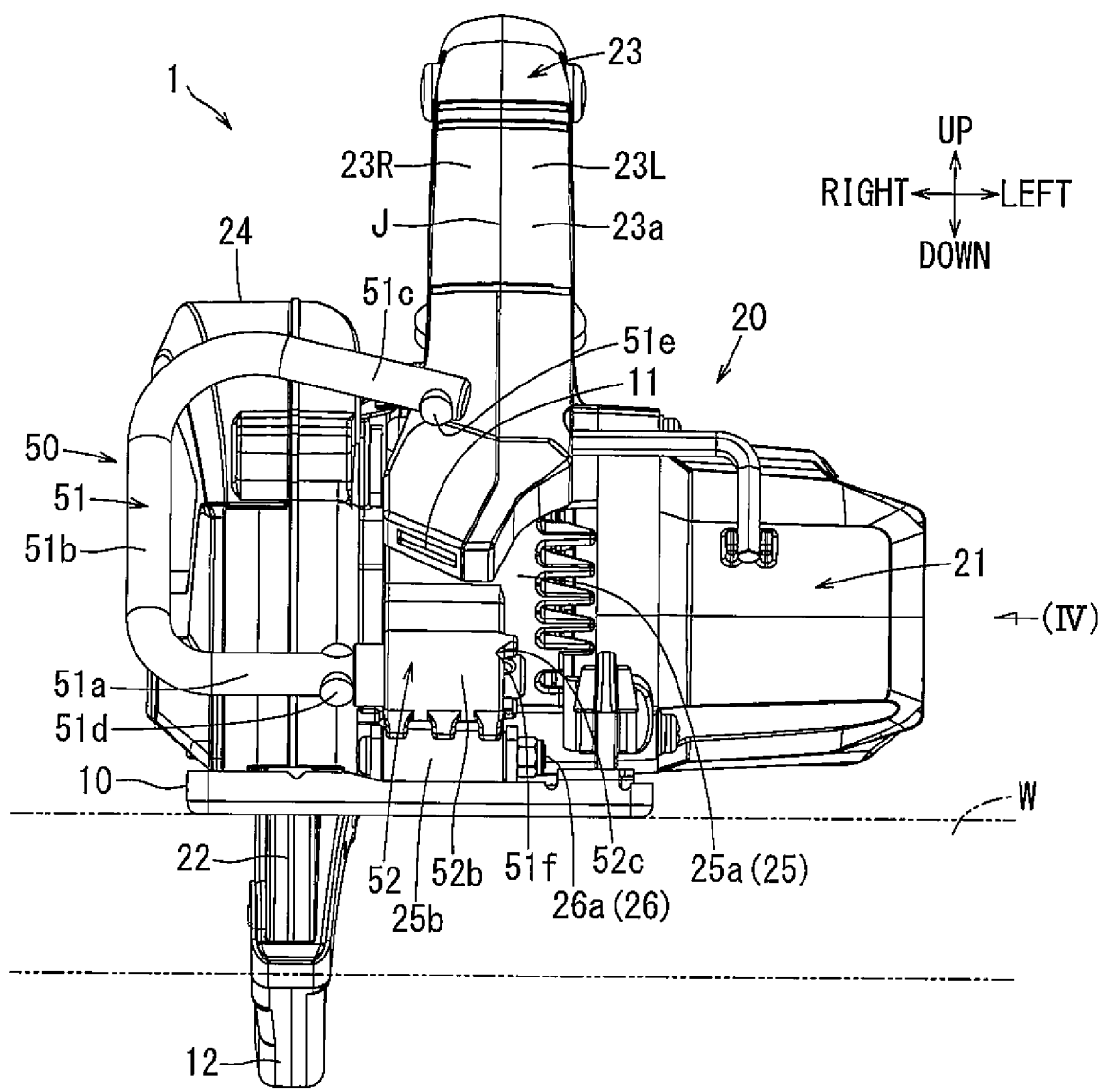
FIG. 2 is a front view of the portable cutting machine according to the first embodiment, as viewed from a direction indicated by an arrow (II) in FIG. 1.

Hereinafter, embodiments of the present disclosure will be described with reference to FIG. 1 to FIG. 28. FIG. 1 to FIG. 10 shows a portable cutting machine 1 according to a first embodiment of the present disclosure. The portable cutting machine 1 according to the first embodiment is a hand-held cutting machine referred to as a tipped saw cutter and may include a base 10 configured to come in contact with a cutting material W and a cutting machine main body 20 supported on an upper side of the base 10. The base 10 is configured in a rectangular flat plate shape and comes in contact with an upper surface of the cutting material W.

As shown in FIGS. 1 to 4, the cutting machine main body 20 may include an electric motor 21 as a drive source, a circular rotary cutting tool 22, and a loop-shaped handle portion 23. A tipped saw blade is used as the rotary cutting tool 22 when cutting a steel material. Substantially an entire upper semi-circumferential portion of the rotary cutting tool 22 (upper side range of the base 10) is covered with a dust-proof fixed cover 24. The fixed cover 24 may be removed from the periphery of the rotary cutting tool 22 by loosening a fixing screw 24a. An arrow 24b indicating a rotation direction of the rotary cutting tool 22 is shown on a right side of the fixed cover 24. A lid portion 24c is provided on a rear part of the fixed cover 24 and is configured to discharge collected cutting chips.

Figure 8:
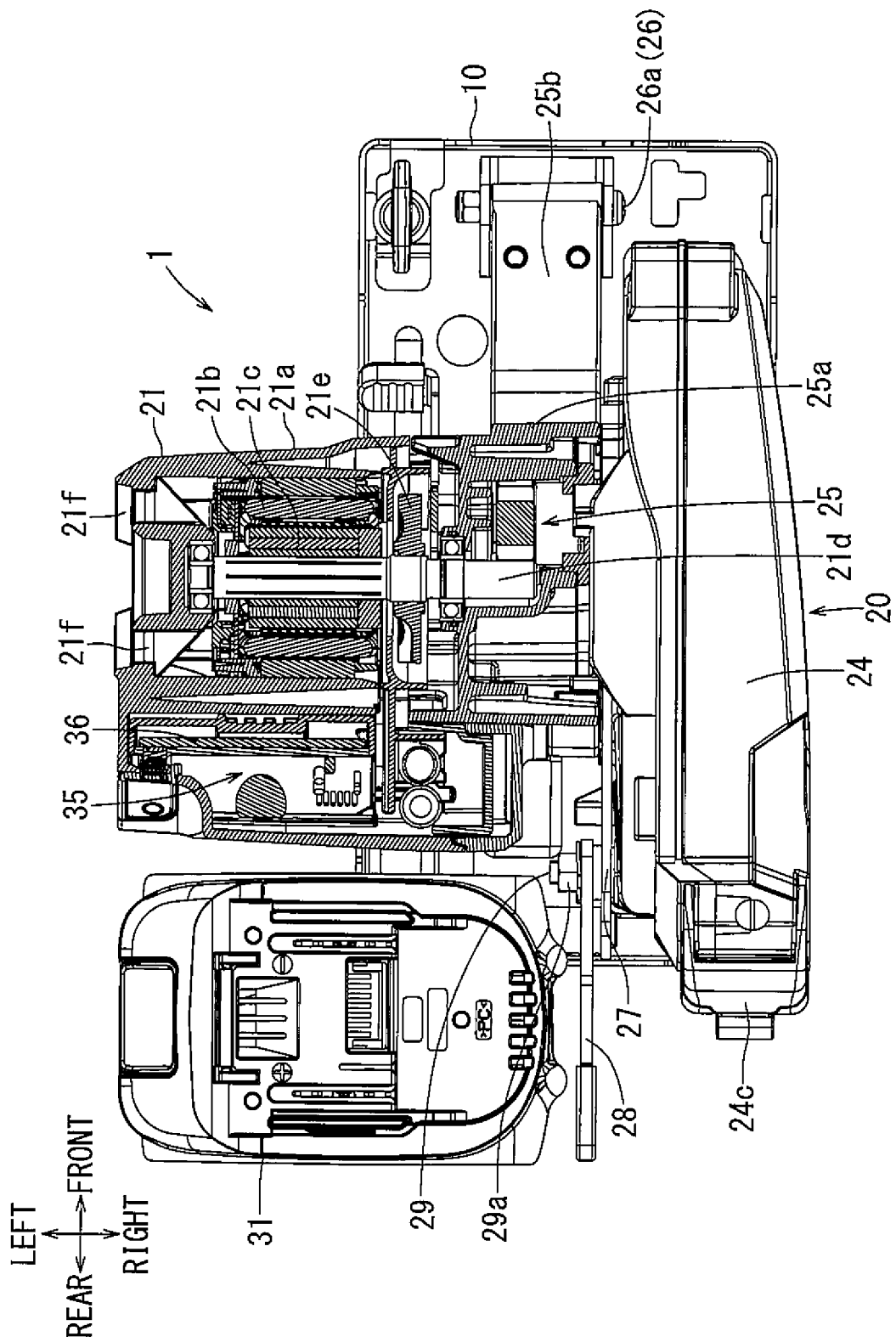
FIG. 8 is a cross-sectional view of the portable cutting machine according to the first embodiment taken along line (VIII)-(VIII) in FIG. 6.

As shown in FIG. 8, the electric motor 21 is coupled to a left side of the fixed cover 24 via a reduction gear portion 25. A support arm portion 25b is integrally formed with a front part of a substantially cylindrical gear housing 25a of the reduction gear portion 25. The support arm portion 25b extends forward. The front part of the support arm portion 25b is coupled to an upper surface of the base 10, via a vertical swing support shaft 26a. The cutting machine main body 20 is supported by an upper surface of a front part of the base 10, so as to be able to swing vertically via the vertical swing support shaft 26a. The support arm portion 25b and the vertical swing support shaft 26a constitute the vertical swing support portion 26 configured to support the cutting machine main body 20, so as to be vertically swingable with respect to the base 10.

A lower part of the rotary cutting tool 22 projects to a lower side through a window portion of the base 10. A periphery around the lower portion of the rotary cutting tool 22 projecting to the lower side of the base 10 is covered with a movable cover 12. The movable cover 12 is provided so as to be able to open and close along the periphery of the rotary cutting tool 22. As illustrated, with its front end in contact with the cutting material W, the movable cover 12 will open relative to the cutting material W when the portable cutting machine 1 moves in a cutting advancing direction.

A part of the rotary cutting tool 22 projecting to the lower side of the base 10 cuts into the cutting material W, such that cutting process is performed. The amount the projecting part of the rotary cutting tool 22 projects from the lower side of the base 10 corresponds to a cutting depth of the rotary cutting tool 22. The cutting depth of the rotary cutting tool 22 may be adjusted by vertically swinging the cutting machine main body 20 about the vertical swing support shaft 26a.

Figure 3:
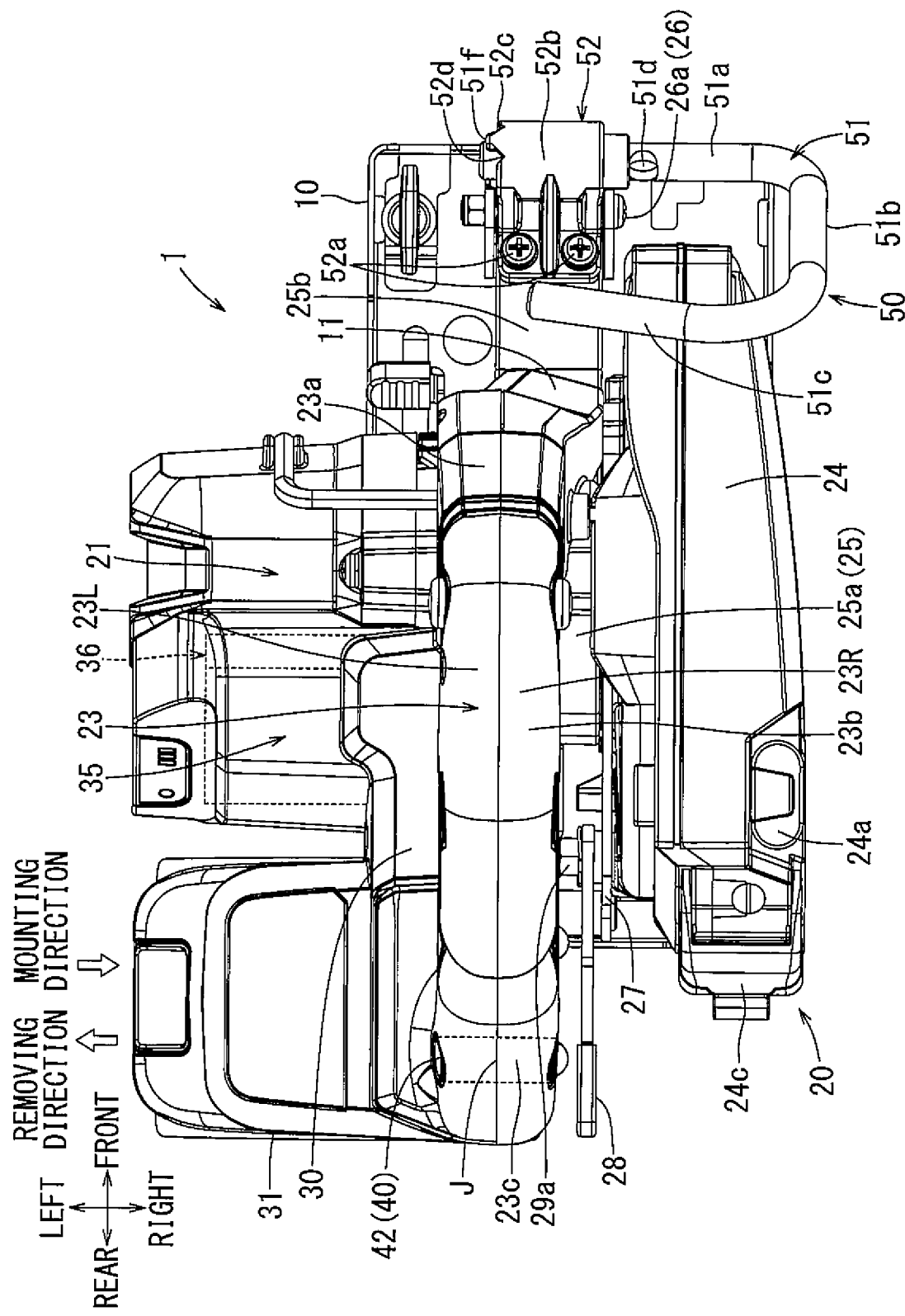
FIG. 3 is a plan view of the portable cutting machine according to the first embodiment, as viewed from a direction indicated by an arrow (III) in FIG. 1.
Figure 4:
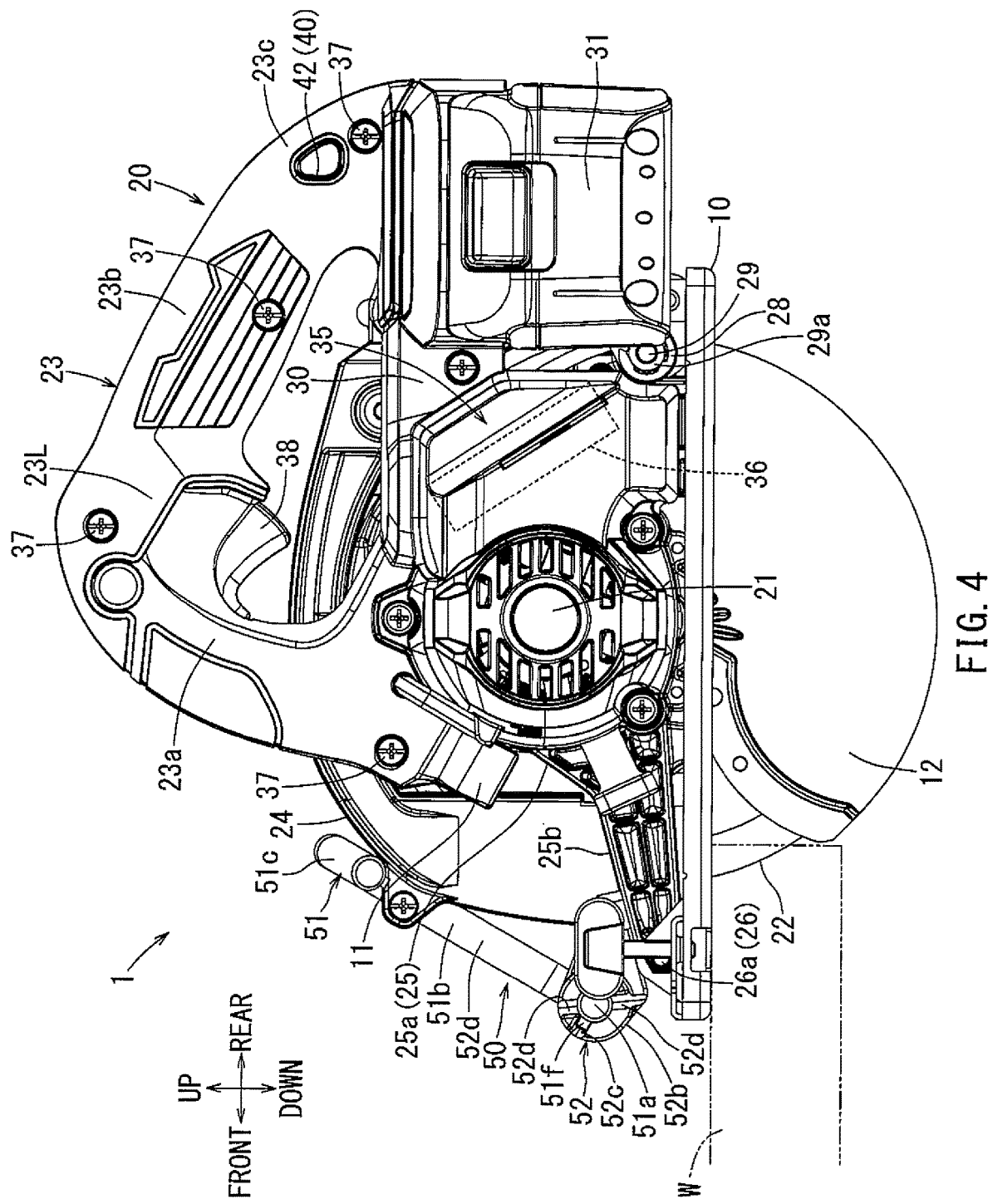
FIG. 4 is a left side view of the portable cutting machine according to the first embodiment, as viewed from the direction indicated by an arrow (IV) in FIG. 2.

As shown in FIG. 3 and FIG. 8, a rear part of the fixed cover 24 is coupled to the upper side of the rear part of the base 10, via a depth guide 27. A fixing screw shaft 29 coupled to the left side of the fixed cover 24 is inserted in a guide groove of the depth guide 27. A fixing nut 29a is loosened from the fixing screw shaft 29 by a loosening operation of the fixed lever 28. This allows the cutting depth to be adjusted by vertically swinging the cutting machine main body 20 about the vertical swing support shaft 26a.

A loop-shaped handle portion 23 is provided on top of the reduction gear portion 25. A trigger-type switch lever 38 is provided on the inner peripheral side of the handle portion 23. A main switch 39 is turned ON when the switch lever 38 is pulled upward with a fingertip. The electric motor 21 starts when the main switch 39 is turned ON. When the pulling operation of the switch lever 38 is released, the main switch 39 is turned OFF, such that the electric motor 21 stops.

A front part 23a of the handle portion 23 is coupled to an upper part of the gear housing 25a. The front part 23a of the handle portion 23 raises upward from the upper part of the gear housing 25a. A grip portion 23b extends obliquely rearward and downward from an upper part of the front part 23a. The rear part of the grip portion 23b is coupled to the rear side of the gear housing 25a, via a battery mount portion 30. A single battery pack 31 is mounted on the lower side of the battery mount portion 30. The electric motor 21, which serves as a drive source, operates using this battery pack 31 as a power source. The battery pack 31 may be removed from the battery mount portion 30 and charged so as to be repeatedly used. As indicated by a void arrow in FIG. 3, the battery pack 31 is mounted to the battery mount portion 30 when slidably moved to the right, and is removed when slidably moved to the left.

An illuminator 11 is provided in front of the reduction gear portion 25 and at a lower part of the front part 23a of the handle portion 23. The illuminator 11 brightly illuminates a cutting part (a part of the rotary cutting tool 22 configured to cut into the cutting material W) such that the cutting work, for example, in a dark place, is facilitated.

Figure 7:
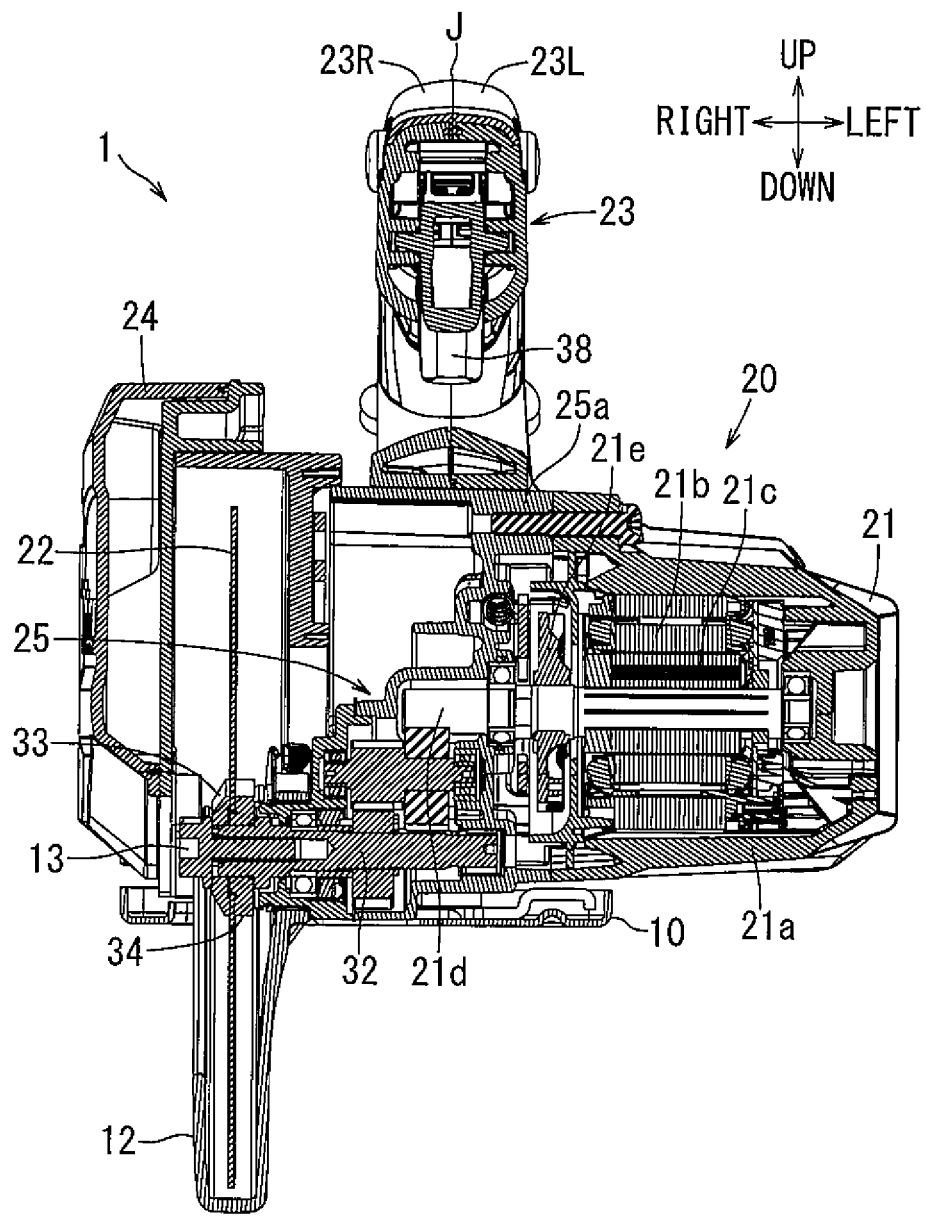
FIG. 7 is a cross-sectional view of the portable cutting machine according to the first embodiment taken along line (VII)-(VII) in FIG. 6.

As shown in FIG. 7 and FIG. 8, a motor housing 21a for housing the electric motor 21 is screwed to the gear housing 25a of the reduction gear portion 25. A brushless motor is used for the electric motor 21. An annular stator 21b is fixed along an inner peripheral side of the motor housing 21a, while a rotor 21c is rotatably supported on the inner peripheral side of the stator 21b. A cooling fan 21e is attached to a motor shaft 21d, which is coupled to the rotor 21c. Ambient air is introduced through a suction port 21f formed in the rear part of the motor housing 21a as the cooling fan 21e is rotated by the electric motor 21. The ambient air introduced through the suction port 21f flows to the right in the motor housing 21a, so as to cool the stator 21b, the rotor 21c, etc. A right end of the motor shaft 21d is meshed with a gear train of the reduction gear portion 25.

As shown in FIG. 7, rotation output of the electric motor 21 is transmitted to an output shaft 32 via a two-stage reduction gear train. The output shaft 32 enters the inside of the fixed cover 24. The rotary cutting tool 22 is attached to the right end of the output shaft 32 within the fixed cover 24. The rotary cutting tool 22 is interposed between two attachment flanges 33, 34. The rotary cutting tool 22 is attached to the left end of the output shaft 32 in this interposed state, for instance by fastening a cutting tool fixing screw 13.

As shown in FIG. 8, a controller accommodating portion 35 is provided on the rear part side of the electric motor 21 and between the electric motor 21 and the battery mount portion 30. A controller 36, mainly for controlling the operation of the electric motor 21, is accommodated in the controller accommodating portion 35. The controller 36 may be formed by accommodating a control board in a rectangular shallow case and filling the case with resin. The controller 36 is accommodated in such a posture that its front side is inclined upward, as indicated by broken lines in FIG. 4 to FIG. 6. The air for cooling the motor introduced into the motor housing 21a by the cooling fan 21e of the electric motor 21 flows into the controller accommodating portion 35 in order to cool the controller 36.

Figure 9:
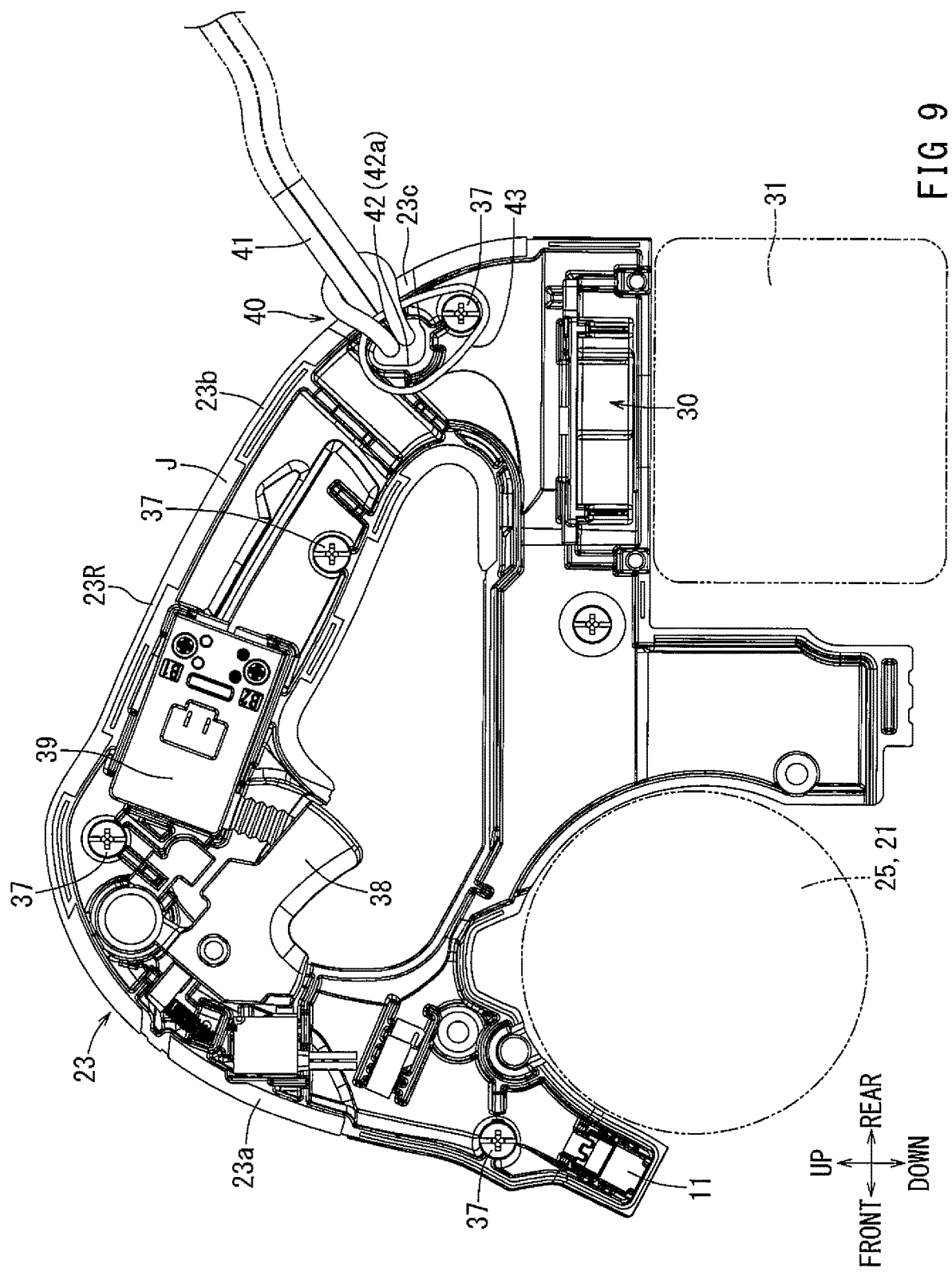
FIG. 9 is a left side view of the handle portion. This figure illustrates a state in which a left handle housing of the left-right halved structure is removed. This figure illustrates a normal state in which a connecting part of the suspending part is not damaged.
Figure 10:
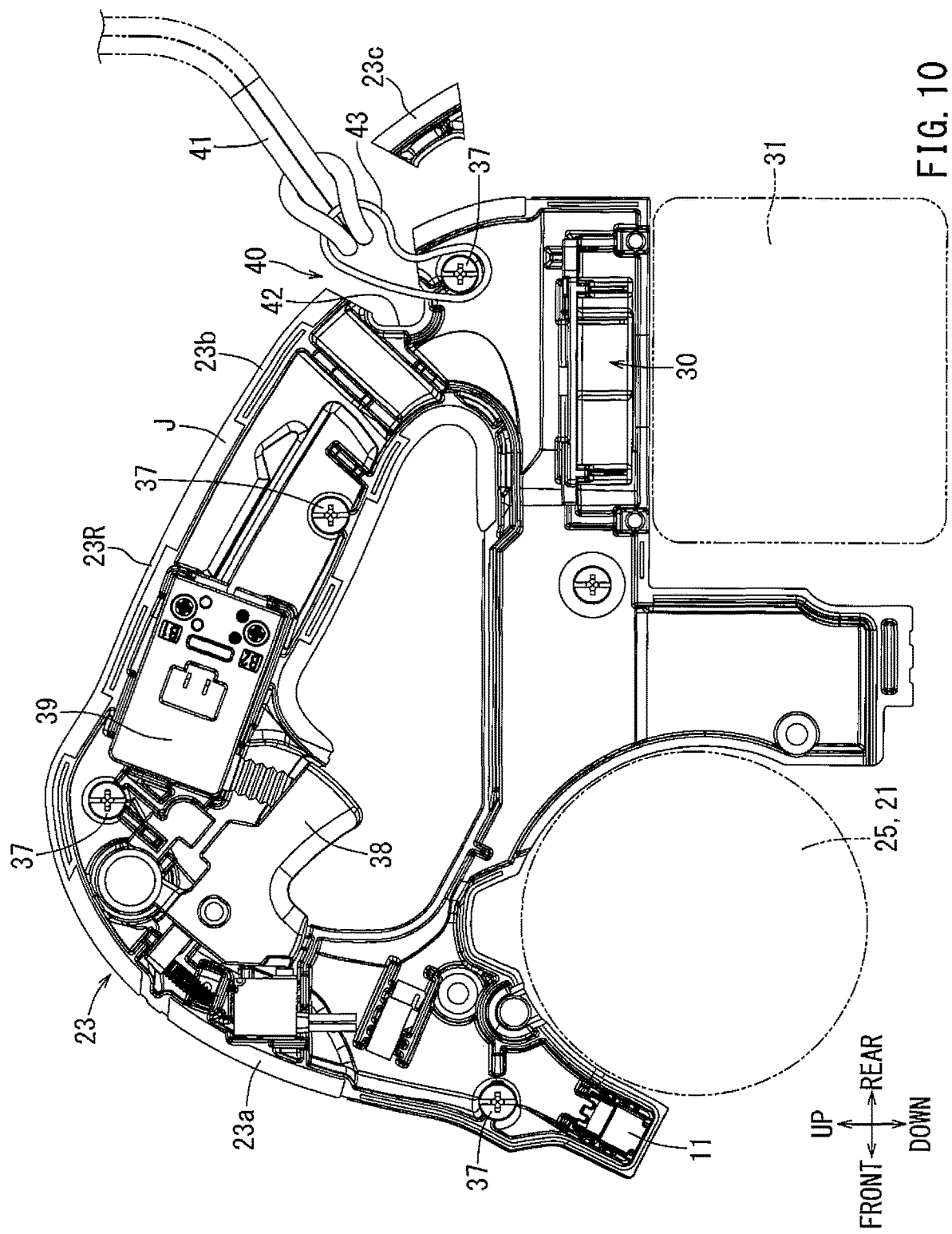
FIG. 10 is a left side view of a handle portion. This figure illustrates a state in which the left handle housing of the left-right halved structure is removed. This figure illustrates a state in which the connecting part of the suspending part is damaged and a notification member has been moved.

A portable cutting machine 1 according to the first embodiment is provided with a connecting part 40 for connecting a suspending member 41, such as a tether strap, etc. The suspending member 41 is configured to suspend the portable cutting machine 1 to, for example, a scaffold or a handrail or the like in a work place. The portable cutting machine 1 may also have a hanging hook 50, which is configured to be directly hooked to the scaffold or the handrail or the like in the work place. The connecting part 40 is provided near the connecting part for the grip portion 23b and near the battery mount portion 30, which is located at a rear part of the handle portion 23. FIG. 9 and FIG. 10 show the details of a connecting part 40 according to the first embodiment. The connecting part 40 has a substantially triangular connecting hole 42. The connecting hole 42 passes through a rear side of the grip portion 23b in the leftward/rightward direction.

As shown in FIG. 2, FIG. 3, FIG. 9, and FIG. 10, the handle portion 23 has a left/right halved structure in which a left handle housing 23L and a right handle housing 23R are abutted and connected to each other. The left handle housing 23L and the right handle housing 23R are connected to each other by a total of four screw fastening parts 37. In the figures, abutment parts of the left handle housing 23L and the right handle housing 23R are denoted by a reference sign J. In FIG. 9 and FIG. 10, the left handle housing 23L is not shown. The connecting hole 42 extends through the left and right handle housings 23L, 23R.

As shown in FIG. 9, a wall portion 42a is provided around the connecting hole 42. An inner peripheral side of the wall portion 42a defines the connecting hole 42. One screw fastening part 37 is adjacently disposed to the connecting hole 42. The notification member 43 is attached so as to extend around both the wall portion 42a of the connecting hole 42 and the boss part of the screw fastening part 37. In the present embodiment, a ring-shaped metal wire is used for the notification member 43. The notification member 43 is configured such that the wall part 42a of the connecting hole 42 and the boss part of the screw fastening part 37 are located on the inner peripheral side of the notification member 43. The notification member 43 is incorporated into the handle portion 23 during an assembling step of the portable cutting machine 1.

As shown in FIG. 9, a suspending member 41, such as a strap or the like, is inserted into the connecting hole 42 and wound around the end 23c of the handle portion 23, so as to be connected to the connecting part 40. The suspending member 41 is thus inserted into the connecting hole 42 and connected to the connecting part 40, while also being inserted into the inner peripheral side of the notification member 43.

According to the connecting part 40, as shown in FIG. 10, the inserted state of the suspending member 41 within the connecting hole 42 may be released when the end 23c is broken, for instance due to damage as a result of an external force being applied to the end 23c of the handle portion 23 after a long term of use, etc. of the suspending member 41. However, as described above, the suspending member 41 is also inserted in the inner peripheral side of the notification member 43. As a result, the suspending member 41 may be kept inserted in the inner peripheral side of the notification member 43, even if the suspending member 41 comes out of the connecting hole 42 when the end 23c of the handle portion 23 is broken. Additionally, the notification member 43 may be kept in a hooked state, with the boss part of the screw fastening part 37 being located on the inner peripheral side of the notification member 43. Therefore, the suspending member 41 may be kept connected to the handle portion 23, via the notification member 43. As a result, the suspending function of the suspending member 41 can be maintained.

Further, as shown in FIG. 10, when the end 23c of the handle portion 23 is broken and separated as a result, the suspending member 41 comes out of the connecting hole 42. As a result, the notification member 43 is pulled out of the interior of the handle portion 23. Since the notification member 43, which was previously incorporated in the inside of the connecting part 40, is pulled to the outside, a user, etc. can visually observe the pulled out notification member 43 easily. The user, etc. can confirm that the inside of the connecting part 40 is deformed or damaged or the like due to the external force as the user, etc. visually observes the pulled out notification member 43. As described above, the notification member 43 has a function for reliably notifying the user, etc. that the connecting part 40 of the suspending member 41 is deformed or damaged or the like.

As shown in FIG. 1 to FIG. 5, the portable cutting machine 1 according to the present embodiment includes a hanging hook 50, in addition to the connecting part 40 for connecting the above-described suspending member 41. The hanging hook 50 is provided at a front part of the cutting machine main body 20 and in front of the fixed cover 24. In the first embodiment, the hanging hook 50 is provided on an upper side of the support arm portion 25b, the support arm portion 25b swingably supporting the cutting machine main body 20 to the base 10. The hanging hook 50 includes a hook bar 51 formed by bending a steel rod into a U-shape and a hook supporting portion 52 configured to support the hook bar 51 on the upper side of the support arm portion 25b.

The hook bar 51 includes a lower lateral part 51a extending in the leftward/rightward direction, a vertical part 51b extending upward from the right end of the lower lateral part 51a, and an upper lateral part 51c extending to the left from the upper part of the vertical part 51b. The lower lateral part 51a extends to the right from the hook supporting portion 52. The vertical part 51b extends in substantially a perpendicular direction from the right end of the lower lateral part 51a. The upper lateral part 51c extends to the left from the upper part of the vertical part 51b. The upper lateral part 51c extends in a slightly acute angle direction from the upper part of the vertical part 51b. An alignment projection 51d is provided on the lower lateral part 51a. A hooking projection 51e is provided on the tip end of the upper lateral part 51c, which is configured to be engaged with an object to be hooked, such as a scaffold.

Figure 5:
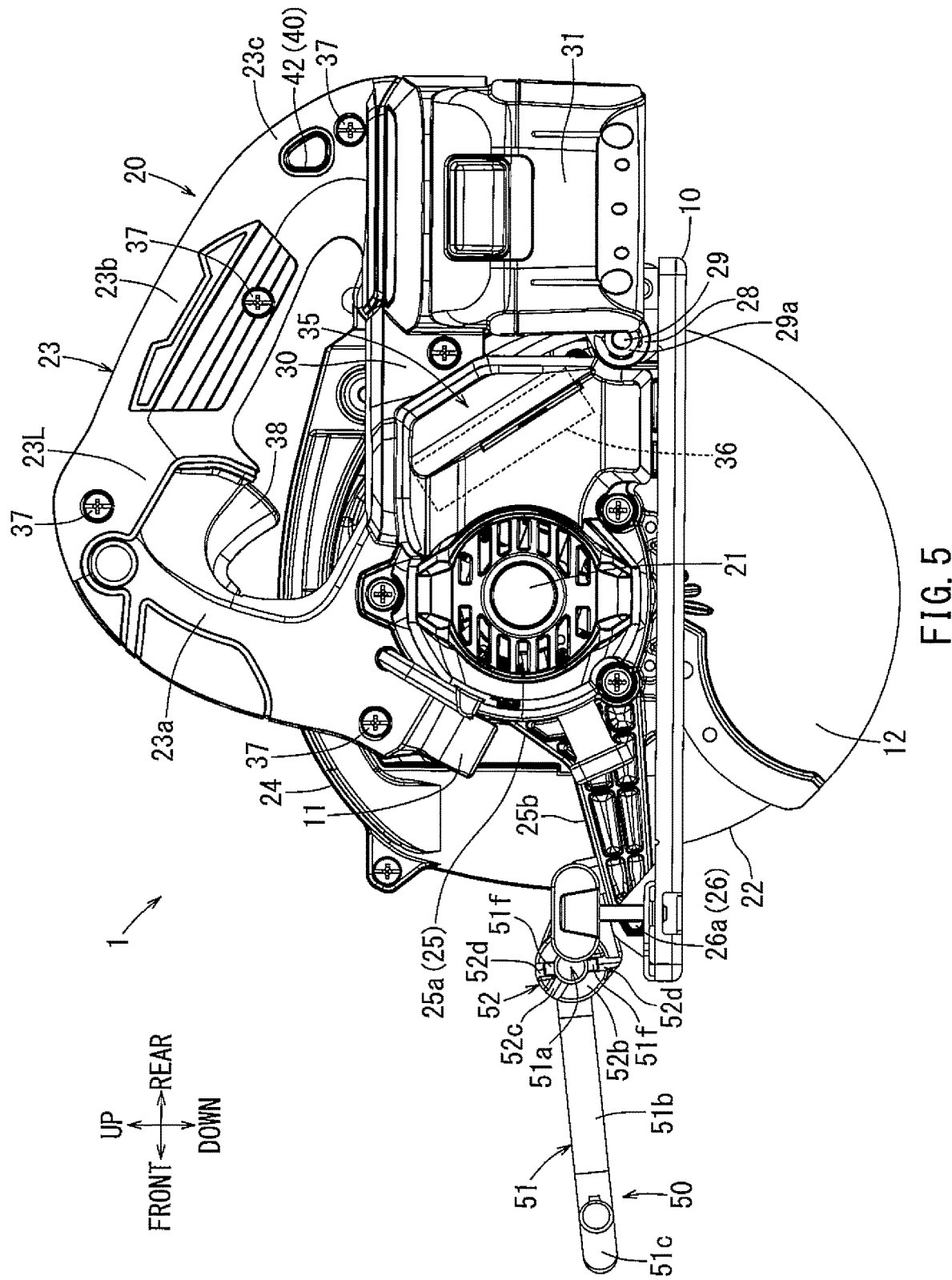
FIG. 5 is a left side view of the portable cutting machine according to the first embodiment. This figure shows a state in which a hook is brought out in a use position.
Figure 6:
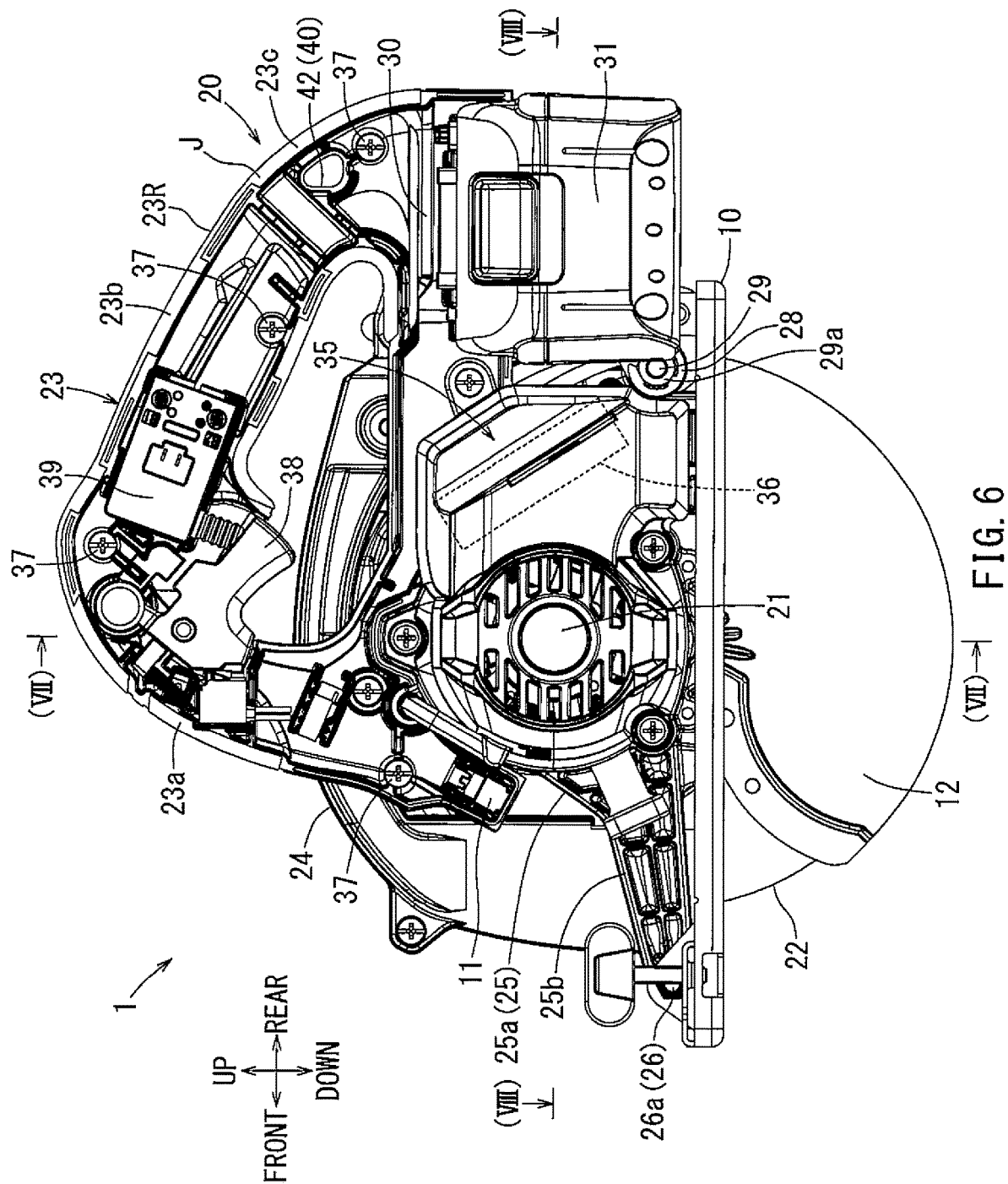
FIG. 6 is a left side view of the portable cutting machine according to the first embodiment. This figure shows a state in which a left handle housing of a left-right halved structure is removed.

As shown in FIG. 3, the hook supporting portion 52 is screwed to the upper side of the support arm portion 25b by two attachment screws 52a. The hook supporting portion 52 includes a cylindrical support tubular portion 52b. The lower lateral part 51a is rotatably and axially movably inserted in this support tubular portion 52b. As a result, the hook bar 51 is supported so as to be able to swing in the upward/downward direction and displace in the leftward/rightward direction about the lower lateral part 51a (e.g., about the left-right lateral axis), which is parallel to a rotation axis of the rotary cutting tool 22. As shown in FIG. 5, two V-shaped engagement grooves 52c, 52d are provided at the left end of the support tubular portion 52b. The two engagement grooves 52c, 52d are disposed in a radial direction passing through the center of support tubular portion 52b. The two engagement grooves 52c, 52d are disposed at a constant angle (about 120 degrees in the present embodiment) with respect to each other.

The left end of the lower lateral part 51a of the hook bar 51 projects from the left end of the support tubular portion 52b. An engagement pin 51f is provided at this projecting portion. The engagement pin 51f projects from both sides of the lower lateral part 51a in the radial direction. Although not visible in figures, a compression spring is interposed between the inner peripheral side of the support tubular portion 52b and the lower lateral part 51a. The lower lateral part 51a is biased by this compression spring so as to be oriented to the right in the axial direction. With this biasing force, the engagement pin 51f is retained in a state in which the engagement pin 51f is fitted into the engagement groove 52c or the engagement groove 52d, such that the lower lateral part 51a is prevented from rotating. By restricting the rotation of the lower lateral part 51a, the hook bar 51 may be retained in a retracted position, with the upper lateral part 51c positioned upward, or in a use position, with the upper lateral part 51c positioned downward (forward). FIG. 1 to FIG. 4 show the hook bar 51 retracted in the retracted position. FIG. 5 shows the hook bar 51 taken out to a use position.

As shown in FIG. 1 to FIG. 4, when the hook bar 51 is retracted in the retracted position, its vertical part 51b is located in a position in which the vertical part 51b is inclined obliquely upward and rearward from the vicinity of the front end of the base 10. In contrast, the hook bar 51 projects greatly forward from the vicinity of the front end of the base 10 so as to be substantially horizontal therewith when the hook bar 51 is taken out and placed in the use position. Since the upper lateral part 51c of the hook bar 51 is moved forward to a location far from the front end of the base 10, the hook bar 51 can be more easily hooked to a scaffold or a handrail or the like. In this respect, the usability of the hanging hook 50 can be enhanced. As shown in FIG. 5, the use position of the hook bar 51 is restricted to be in a position in which the hook bar 51 does not project below the lower side of the base 10, instead being positioned above the base 10. This prevents the hook bar 51 from interfering with the cutting material W or the rotary cutting tool 22, even if the hook bar 51 is inadvertently moved to the use position during a cutting work.

In FIG. 11 to FIG. 18, a portable cutting machine 60 according to the second embodiment is shown. The similar components or structures as those of the portable cutting machine according to the first embodiment will be denoted with the same reference numerals and will not be described. The portable cutting machine 60 according to the second embodiment is a portable cutting machine configured to perform cutting process, mainly on wood or the like, and is also referred to as a portable circular saw. The portable cutting machine 60 according to the second embodiment is different from the portable cutting machine 1 according to the first embodiment in that a circular saw blade is used as a rotary cutting tool 61. Further, a fixed cover 62 is provided along an upper peripheral edge of the rotary cutting tool 61 and the center of the rotary cutting tool 60 is exposed at the side, so that greater convenience can be achieved, for example, when replacing the cutting tool. In contrast, the portable cutting machine 1 according to the first embodiment has substantially all of the rotary cutting tool 22 on the upper side of the base 10 covered, such that the dust collecting property is enhanced. In the first embodiment, the fixed cover 24 is made to be removable, such that greater convenience can be achieved, for example, when replacing the cutting tool.

Similarly, according to the portable cutting machine 60 of the second embodiment, the cutting machine main body 20 is supported by the base 10, so as to be vertically swingable about the vertical swing support shaft 63a of the vertical swing support portion 63. The portable cutting machine 60 of the second embodiment also includes a cutting depth adjusting mechanism to adjust the rotary cutting tool 61 with respect to the workpiece W, similar to the portable cutting machine 1 according to the first embodiment. According to the portable cutting machine 60 of the second embodiment, the cutting machine main body 20 is supported so as to be able to swing to the left and right via a front support part 64 at the front side of the base 10 and a rear support part 65 at the rear side. The cutting machine main body 20 can perform so-called bevel cutting by being tilted to the left or right. The portable cutting machine 60 according to the second embodiment is different from the portable cutting machine 1 according to the first embodiment in that it has a bevel cut function.

In the portable cutting machine 60 according to the second embodiment, a front grip portion 68 is provided at the front part of the handle portion 23. The user takes a position behind the portable cutting machine 60 and grasps the handle portion 23 with his/her right hand and a front grip portion 68 with his/her left hand, such that the portable cutting machine 60 can be operated to move in a stable manner. In this respect, the operability of the portable cutting machine 60 is enhanced.

Figure 11:
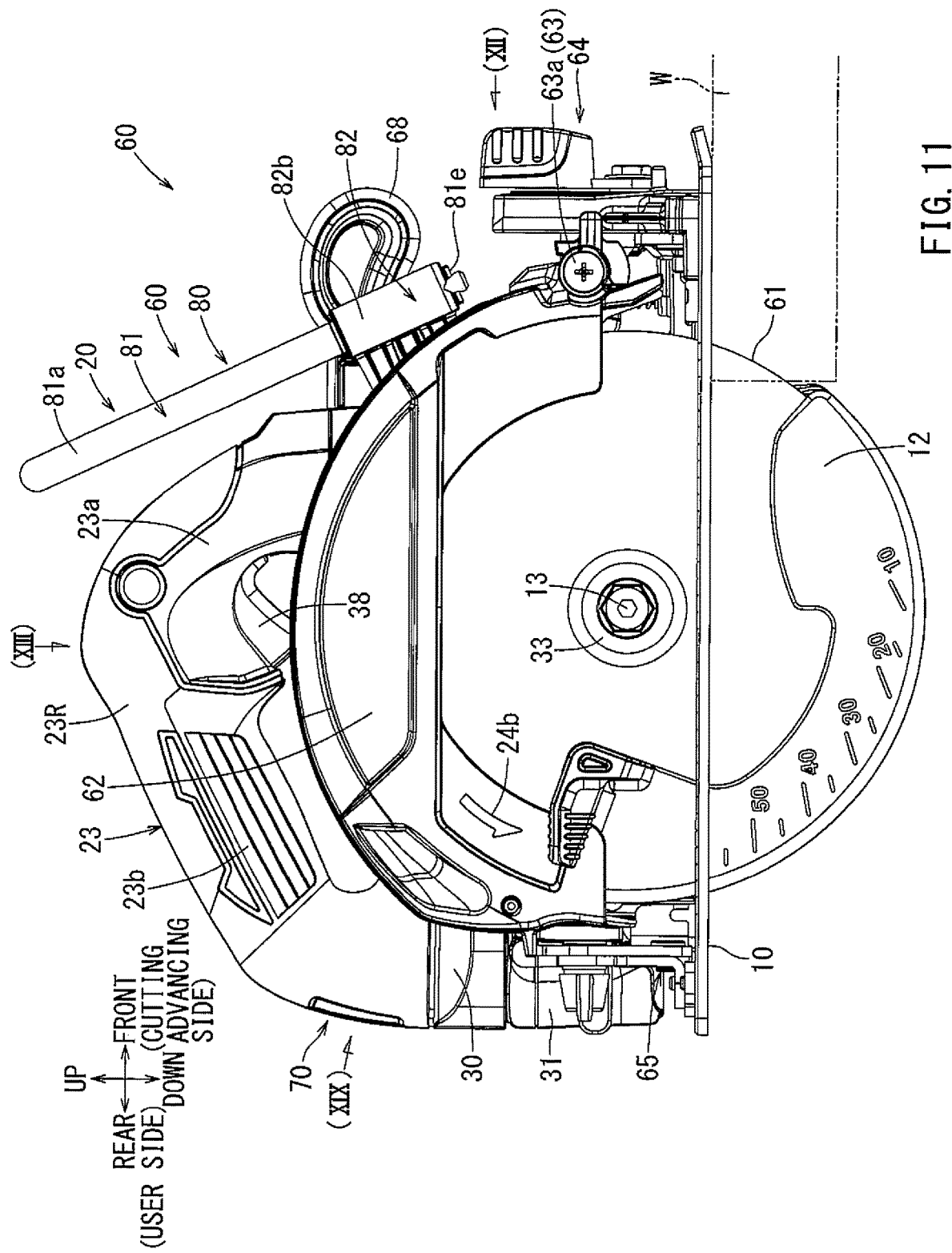
FIG. 11 is a right side view of the portable cutting machine according to a second embodiment. This figure illustrates a state in which a hook is located in a retracted position.
Figure 12:
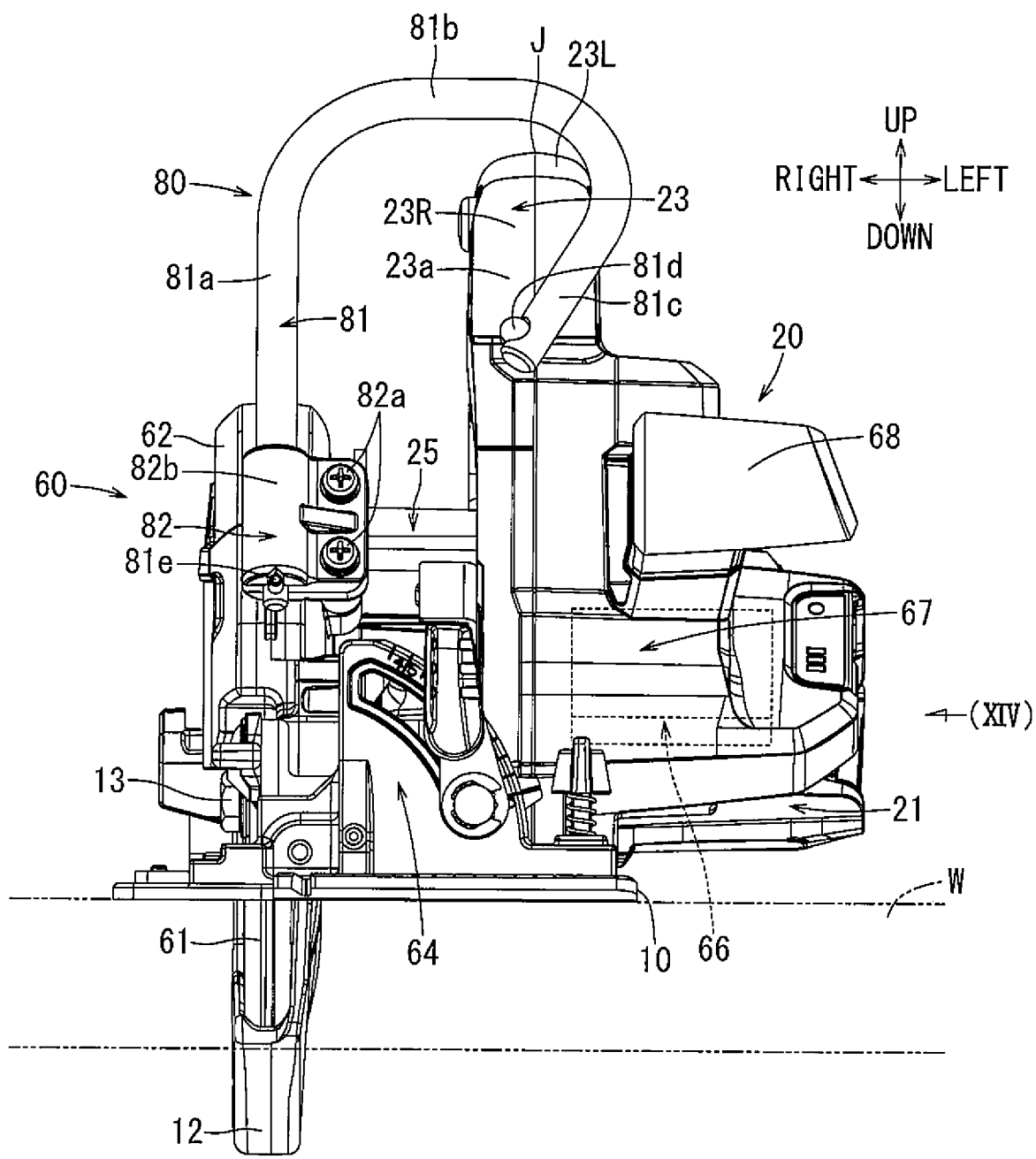
FIG. 12 is a front view of the portable cutting machine according to the second embodiment, as seen from a direction indicated by an arrow (XII) in FIG. 11.
Figure 13:
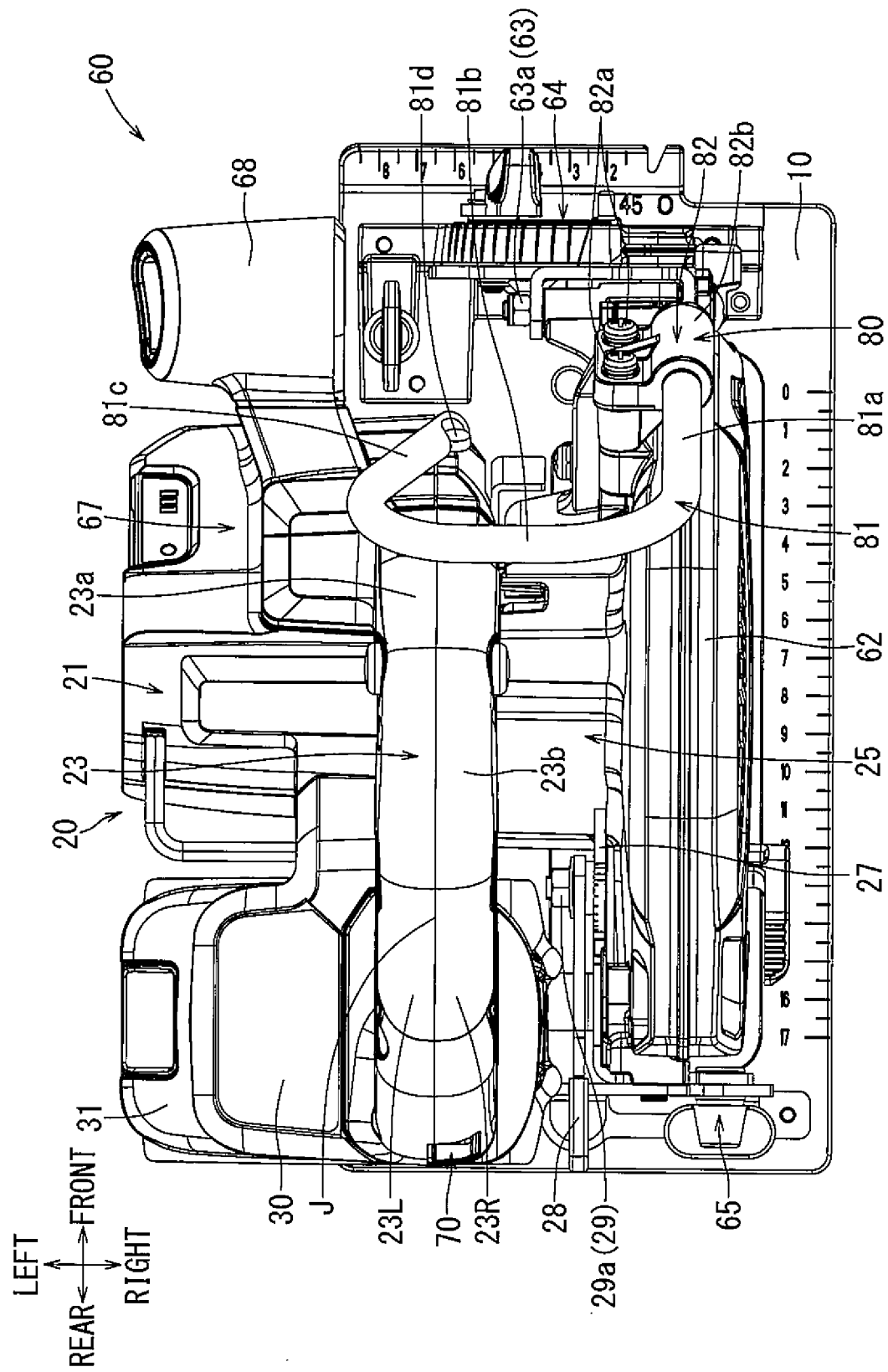
FIG. 13 is a plan view of the portable cutting machine according to the second embodiment, as viewed from the direction indicated by an arrow (XIII) in FIG. 11.
Figure 14:
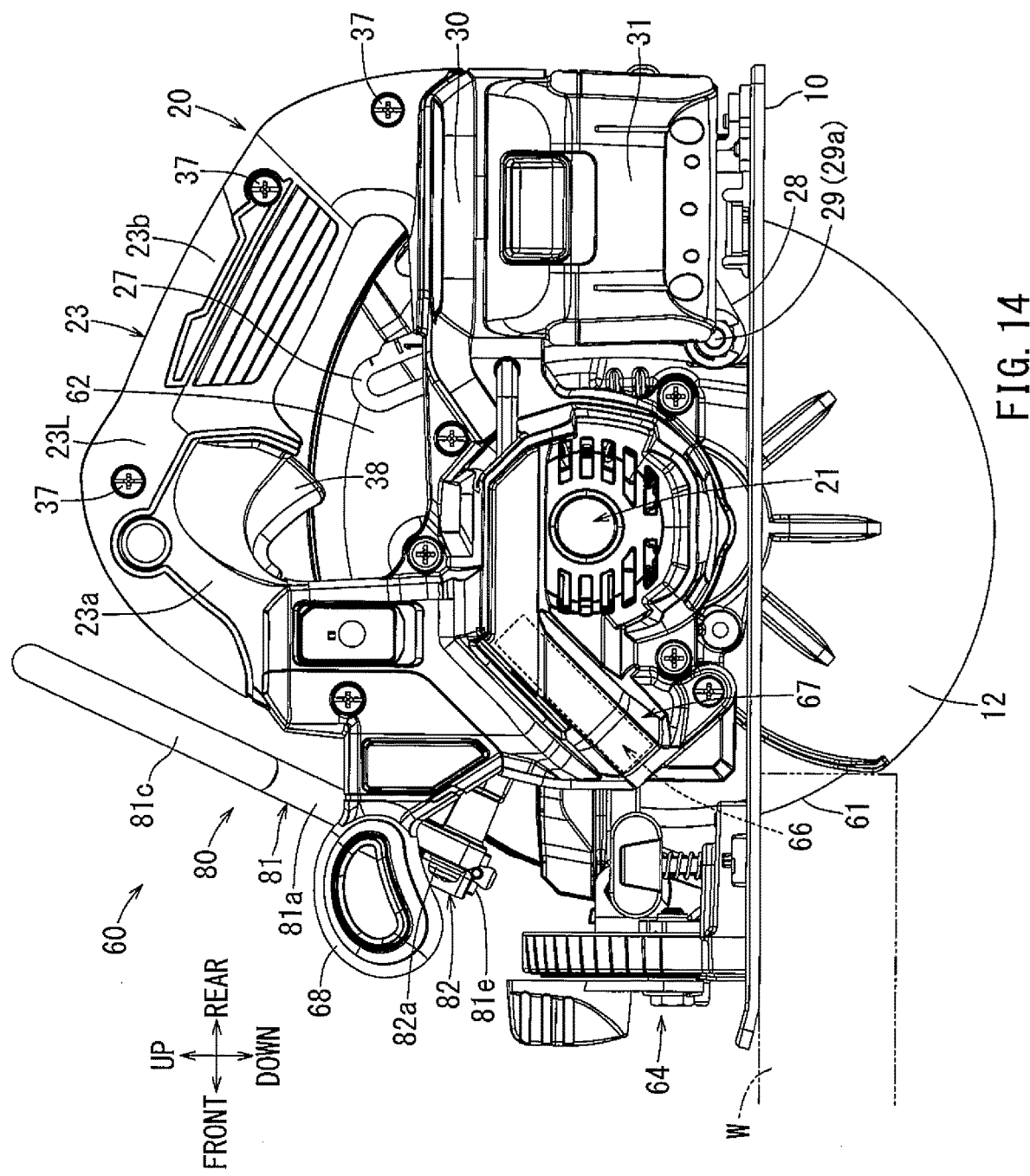
FIG. 14 is a left side view of the portable cutting machine according to the second embodiment, as viewed from the direction indicated by an arrow (XIV) in FIG. 12.

As shown in FIG. 14, the portable cutting machine 60 according to the second embodiment, a controller 66 for controlling operation of the electric motor 21 is housed in the controller housing 67 provided in front of the electric motor 21. The battery mount portion 30 can be arranged more closely to the electric motor 21 by arranging the controller housing 67 in front of the electric motor 21, unlike the first embodiment. Thereby, the cutting machine main body 20 can be made more compact in the frontward/rearward direction. Therefore, as shown in FIG. 11, FIG. 13, and FIG. 14, according to the portable cutting machine 60 of the second embodiment, the cutting machine main body 20 is configured so as not to project from the rear end of the base 10. This enhances the handling property of the portable cutting machine 60 during the cutting operation and ensures compactness when retracted.

The portable cutting machine 60 according to the second embodiment includes a connection part 70 and a hanging hook 80, which are differently structured from the connecting part 40 and the hanging hook 50 according to the first embodiment. The connection part 70 according to the second embodiment is a part to which the suspending member 71, such as a so-called tether strap, is connected. Similar to the first embodiment, it is provided on a rear side of the handle portion 23. The details of the connecting part 70 according to the second embodiment are illustrated in FIG. 19 to FIG. 24.

The connecting part 70 according to the second embodiment includes a connecting hole 72. The connecting hole 72 forms a U-shaped path along a periphery of the screw fastening part 37. The screw fastening part 37 is configured to connect the left handle housing 23L and the right handle housing 23R in a left-right halved structure of the handle portion 23, so as to be abutted against each other. Therefore, openings 72a, 72b of the connecting hole 72 are formed at both the upper and lower sides of the screw fastening part 37. The connecting hole 72 is divided from the interior of the handle portion 23 by a wall portion 72c, which is provided along the periphery of the screw fastening part 37. The connecting hole 72 is provided along the U-shaped path formed between the wall portion 72c and the screw fastening part 37.

Figure 22:
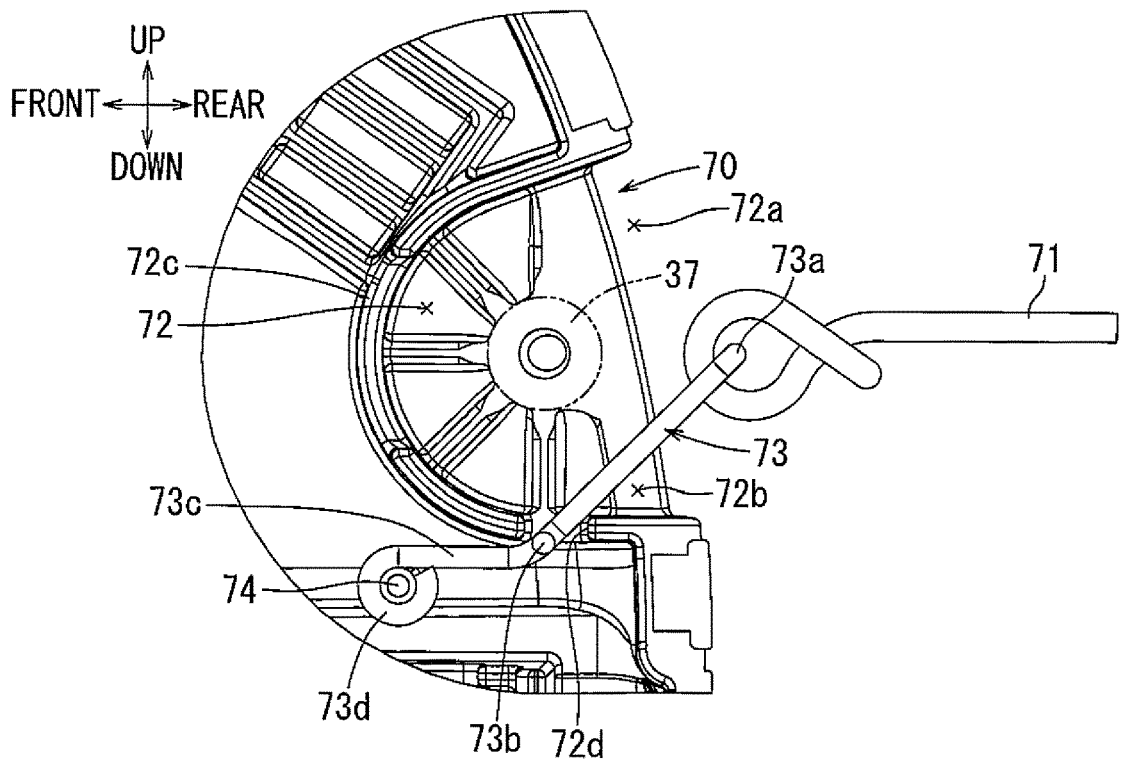
FIG. 22 is a vertical cross-sectional view of the suspending part according to the second embodiment. This figure illustrates a state in which the connecting part is damaged and the notification member is moved.
Figure 23:
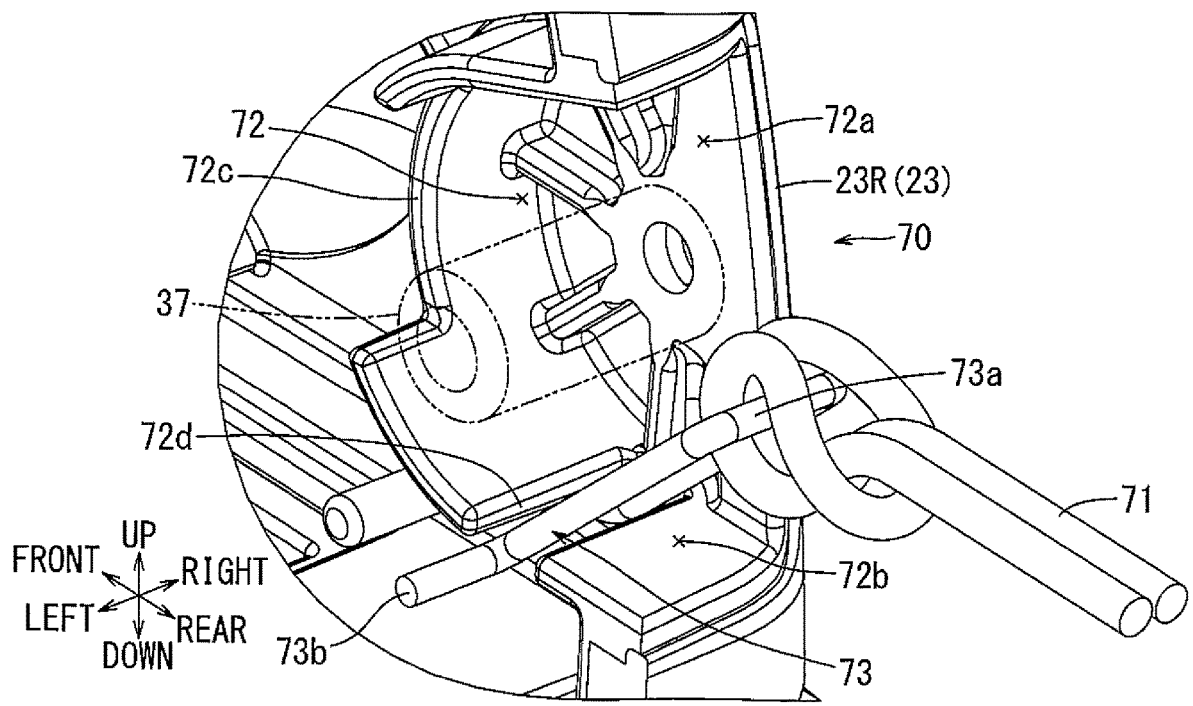
FIG. 23 is a perspective view of the suspending part according to the second embodiment. This figure illustrates a state in which the connecting part is damaged and the notification member has been moved.
Figure 24:
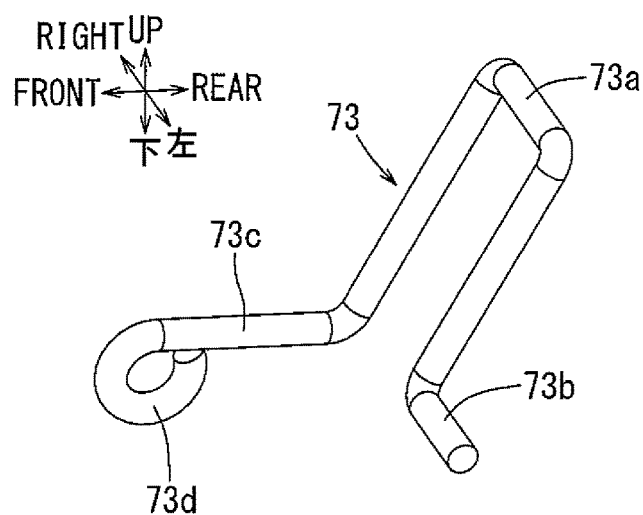
FIG. 24 is a perspective view of the notification member positioned at the suspending part of the second embodiment.

The notification member 73 is at least partly in the inner side of the connecting hole 72. FIG. 24 shows this embodiment of the notification member 73 alone. The notification member 73 according to the second embodiment is formed by bending a steel rod. The notification member 73 according to the second embodiment includes a hook part 73a bent in a U-shape, an engagement part 73b formed by bending one end of the hook part 73a to the left in an L-shape, and a leg part 73c formed by bending the other end of the hook part 73a to the front into an L-shape. A support part 73d, which is bent in a circular shape, is formed at the front part of the leg part 73c. As shown in FIG. 20 to FIG. 23, the notification member 73 is incorporated so that the hook part 73a is positioned substantially below the screw fastening part 37 within the connecting hole 72.

The engagement part 73b, the leg part 73c, and the support part 73d of the notification member 73 are positioned outside from the wall portion 72c passing through a cutout 72d formed in the wall portion 72c of the connecting hole 72. As shown in figures, the support part 73d of the leg part 73c is hooked and connected to an engagement part 74 provided at the right handle housing 23R. Although not shown in the figures, the engagement part 73b of the notification member 73 is inserted into an engagement hole formed in the inner surface of the left handle housing 23L. In this way, the engagement part 73b and the leg part 73c of the notification member 73 are connected to the left and right handle housings 23L, 23R, such that the hook part 73a is provided in the area of the opening of the cutout 72d so as to be swingable in the upward/downward direction.

Figure 20:
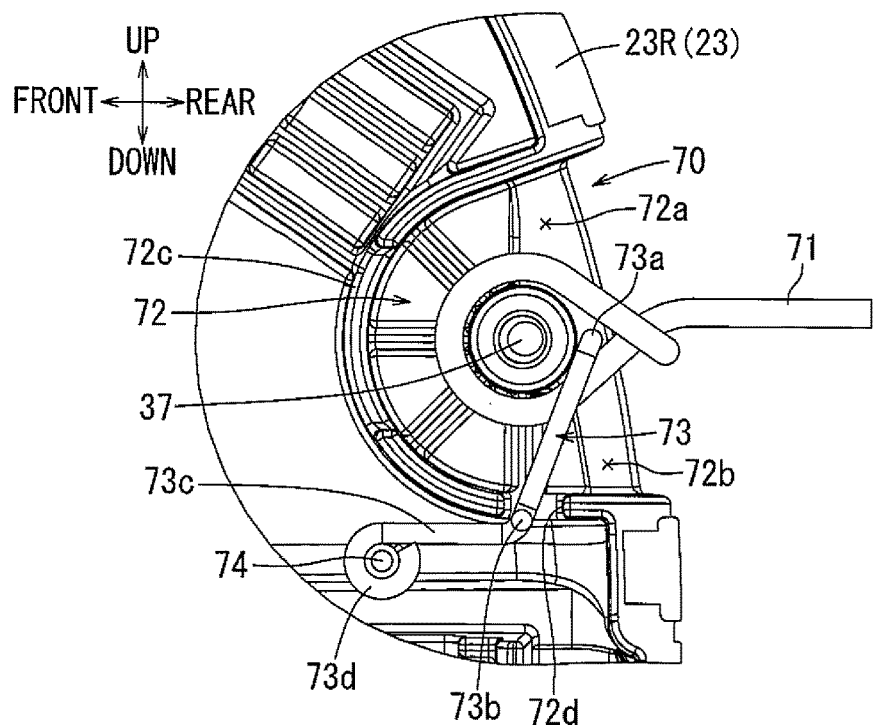
FIG. 20 is a cross-sectional view of the suspending part according to the second embodiment taken along line (XX)-(XX) in FIG. 19. This figure illustrates a normal state in which the connecting part is not damaged.
Figure 21:
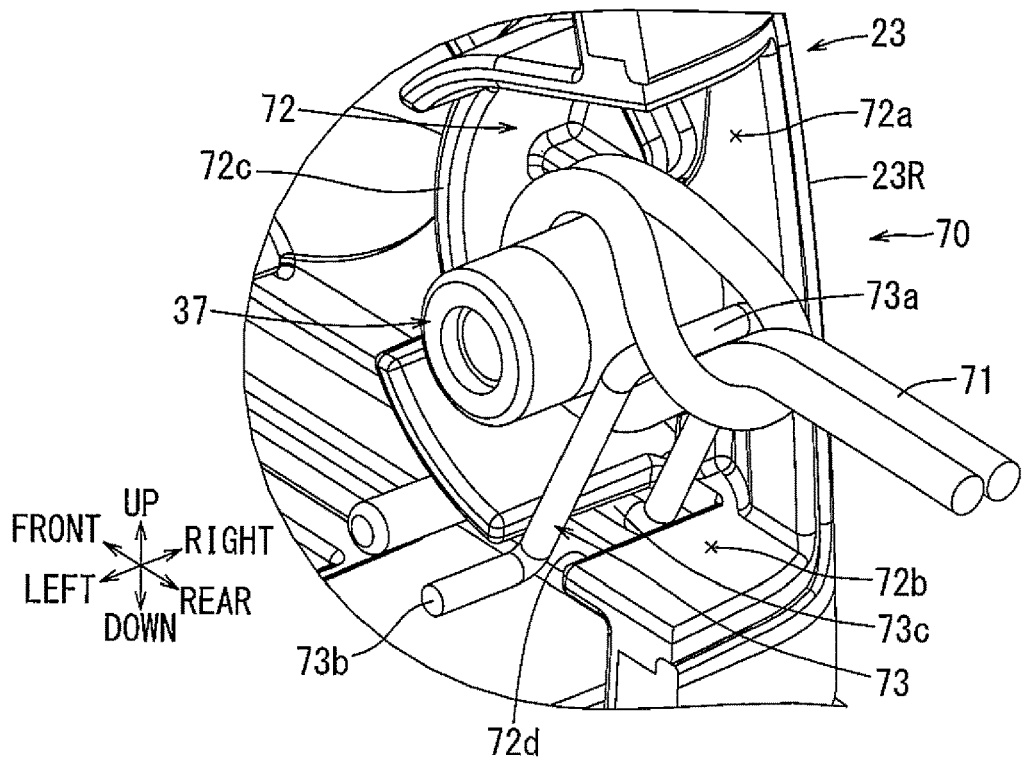
FIG. 21 is a perspective view of the suspending part according to the second embodiment. This figure illustrates a normal state in which the connecting part is not damaged.

As shown in FIG. 20 and FIG. 21, the suspending member 71 is inserted through the inside the hook part 73a of the notification member 73 and is connected by being wound around the screw fastening part 37. According to the connecting part 70 as configured above, as shown in FIG. 22 and FIG. 23, the suspending member 71 may maintain being hooked to the hook part 73a of the notification member 73, even if the screw fastening part 37 is missing due to damage by application of an external force to the screw fastening part 37, for instance after a long term of use, etc. of the suspending member 71. The notification member 73 may maintain being connected to the handle portion 23, via the engagement part 73b and the leg part 73c. Therefore, the suspending member 71 may be kept connected to the handle portion 23 via the notification member 73, and, as a result, the suspending function of the suspending member 71 can be maintained.

Further, when the screw fastening part 37 is broken and separated from the connecting part 70, and, as a result, when the suspending member 71 comes out from the connecting hole 72, the notification member 73 is pulled out to project from the lower opening 72b of the connecting hole 72. Since the notification member 43 that was positioned in the inside of the connecting part 70 is now pulled outside, a user, etc. can visually observe the pulled out notification member 43 easily. The user, etc. can confirm that the inside of the connecting part 70 is deformed or damaged or the like due to the external force. This may be done by the user, etc. visually observing the notification member 43 has been pulled toward the outside of the connecting part 70. As described above, the notification member 73 has a function of reliably notifying the user, etc. that the connecting part 70 of the suspending member 71 has been deformed or damaged or the like. With the notification function of the notification member 73, it is possible to notify the user of portable cutting machine 60 failures, similar to the first embodiment.

As shown in FIG. 11 to FIG. 14, a hanging hook 80 according to the second embodiment is supported at a front part of the fixed cover 62. The hanging hook 80 includes a hook bar 81 formed by bending a steel rod in a U-shape. The hanging hook 80 also includes a hook supporting portion 82 configured to support the hook bar 81 at the front part of the fixed cover 62. The hook bar 81 includes a vertical part 81a extending upward from the hook supporting portion 82, a lateral part 81b extending in substantially a perpendicular direction from the upper part of the vertical part 81a, and a hook part 81c extending downward from the front end of the lateral part 81b at an acute angle direction. A hooking projection 81d is provided on the tip end of the hook part 81c, which may engage an object to be hooked, such as a scaffold. As shown in FIG. 11, the vertical part 81a is inclined in a rearward inclined direction, such that the upper part is further displaced in the rearward direction.

The hook supporting portion 82 is screwed to the front part of the fixed cover 62 with two attachment screws 82a. A cylindrical support tubular portion 82b is configured to the hook supporting portion 82. The lower part of the vertical part 81a is rotatably and axially movably inserted in this support tubular portion 82b. As a result, the hook bar 81 is supported so as to be able to be swingable in the leftward/rightward direction and displaceable in the upward/downward direction about the vertical part 81a.

A lower end of the vertical part 81a of the hook bar 81 projects from the lower end of the support tubular portion 82b. An engagement pin 81e is provided on the projecting part of the vertical part 81a to project from both radial sides. Two V-shaped engagement grooves extending through the center of the tubular portion 82b are provided at the lower end of the support tubular portion 82b. Similar to the first embodiment, the rotational motion of the vertical part 81a of the second embodiment is restricted when the engagement pin 81e is fitted into any one of the engagement grooves, thereby locking the position of the hook bar 81. In the second embodiment, the hook bar 81 may be held in four positions around the vertical part 81a. Similar to the first embodiment, the vertical part 81a of the hook bar 81 is biased in the upward direction by a compression spring interposed between the vertical part 81a and the support tubular portion 82b. With this biasing force of the compression spring, the engagement pin 81e is held in a state fitted into the engagement groove, such that the position of the hook bar 81 around the vertical part 81a can be maintained.

Figure 15:
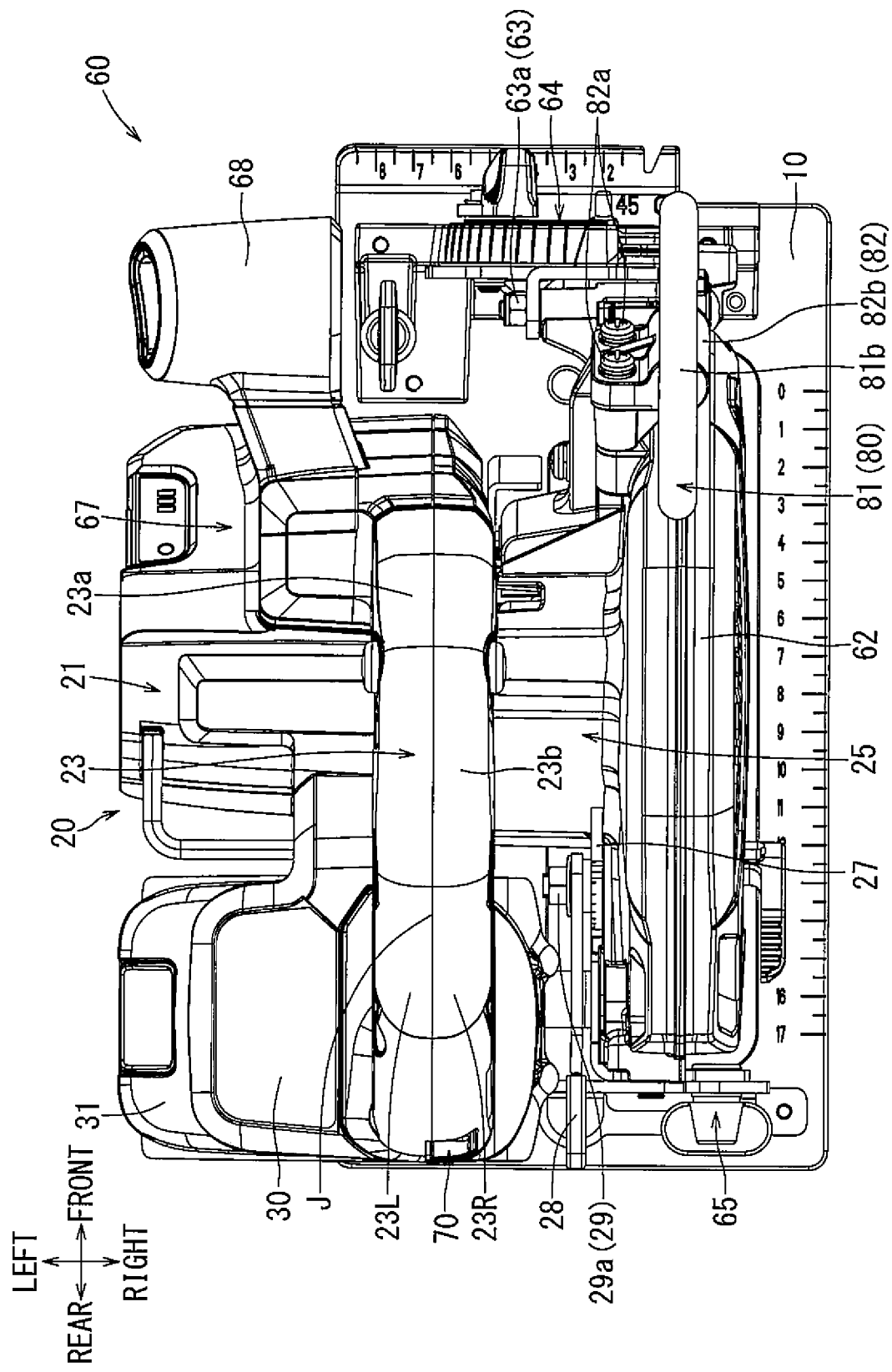
FIG. 15 is a plan view of the portable cutting machine according to the second embodiment. This figure illustrates a state in which the hook is located in a front use position.
Figure 16:
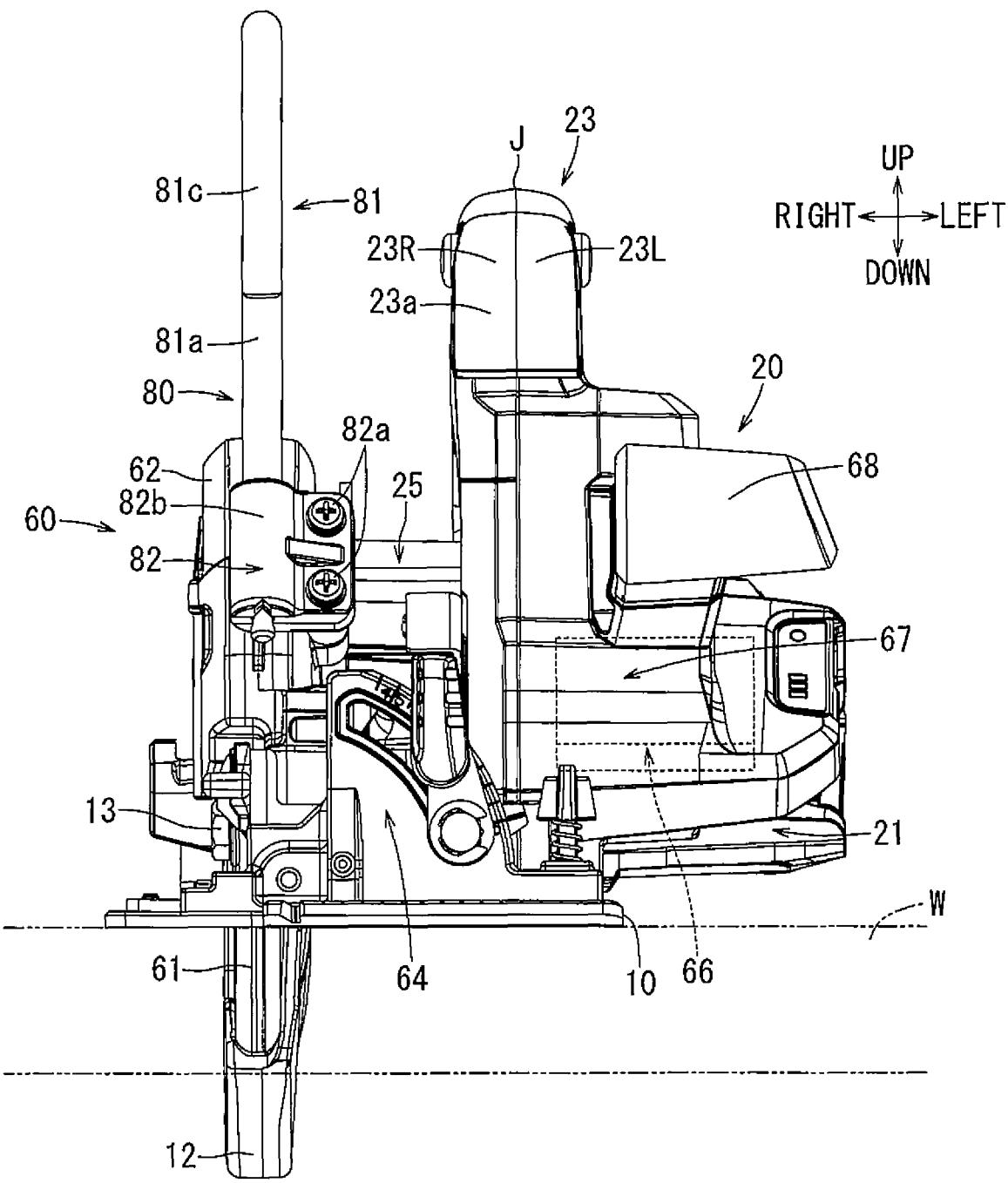
FIG. 16 is a front view of the portable cutting machine according to the second embodiment. This figure illustrates a state in which the hook is located in the front use position.
Figure 17:
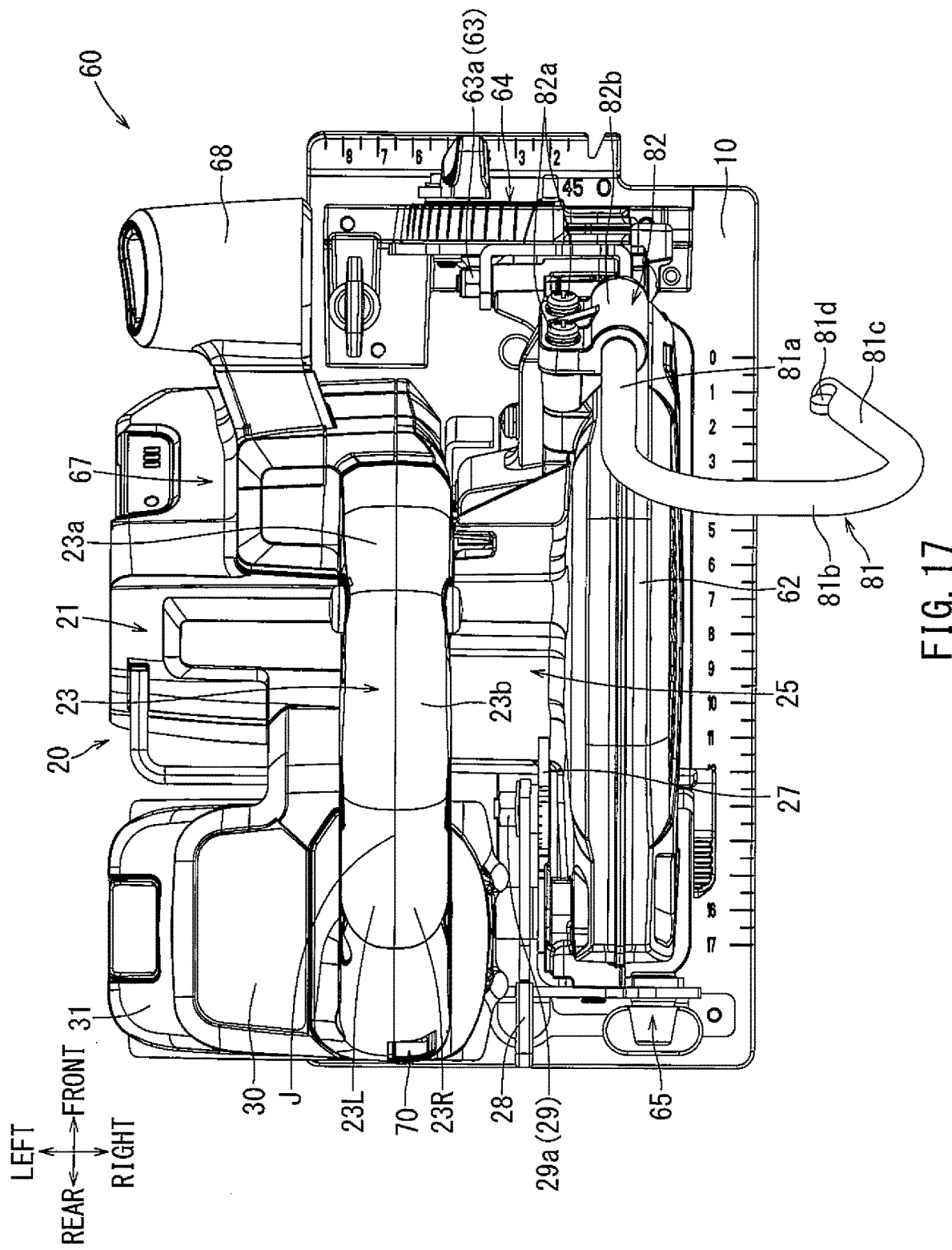
FIG. 17 is a plan view of the portable cutting machine according to the second embodiment. This figure illustrates a state in which the hook is located in a side use position.
Figure 18:
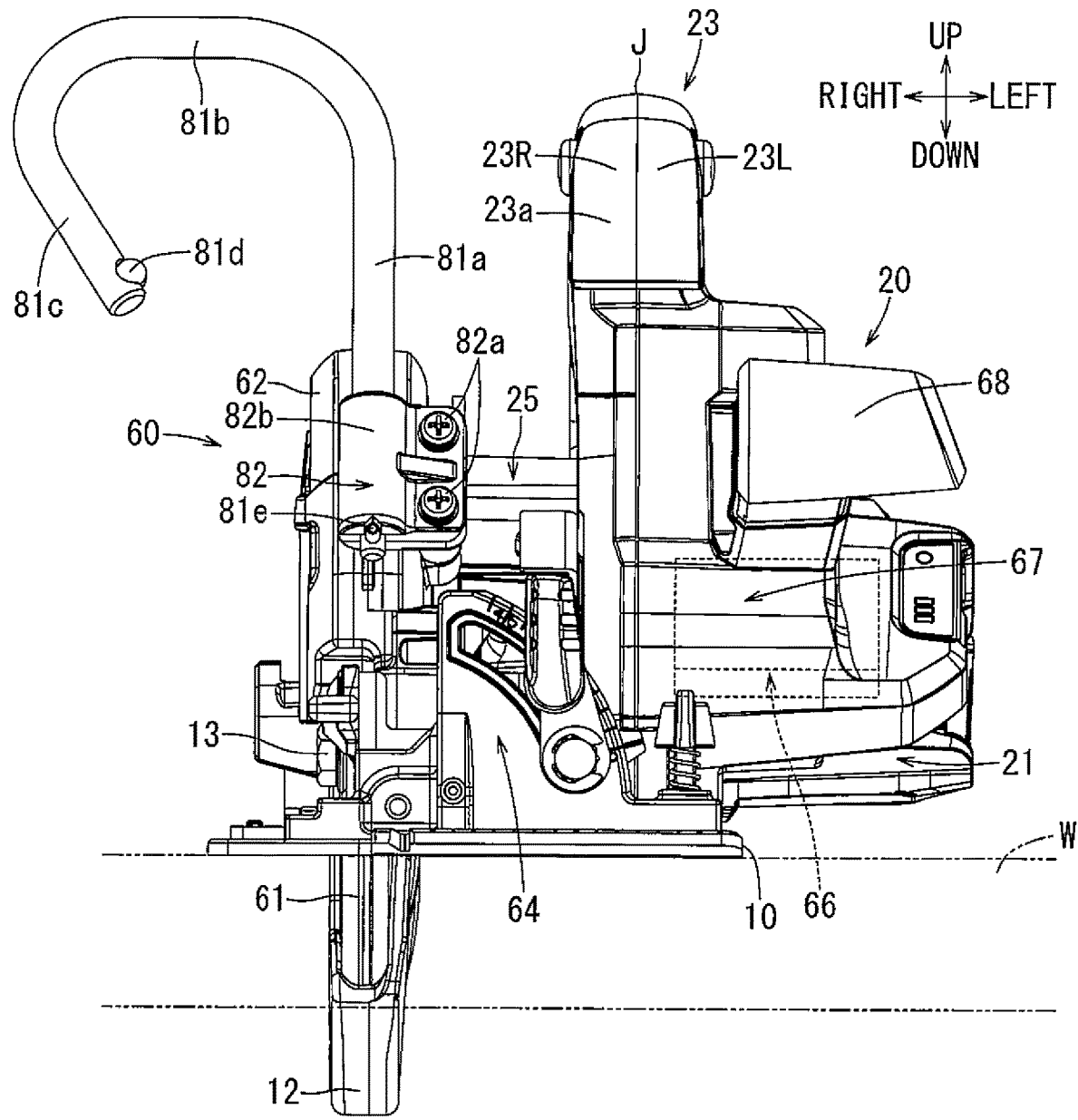
FIG. 18 is a front view of the portable cutting machine according to the second embodiment. This figure illustrates the state in which the hook is located in the side use position.
Figure 19:
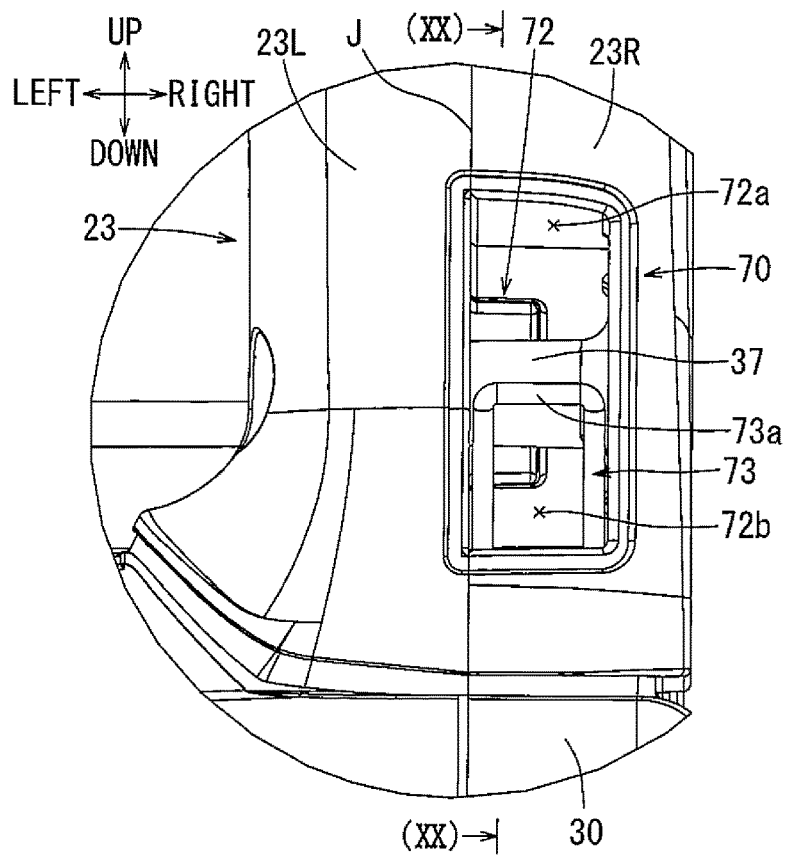
FIG. 19 is a rear view of a suspending part according to the second embodiment as viewed from a direction indicated by an arrow (XIX) in FIG. 11.

FIG. 11 to FIG. 14 illustrate a state in which a hook part 81c is held at a retracted position, where the hook part 81c is located in front of the handle portion 23 (e.g., toward the left side of the fixed cover 62). FIG. 15 and FIG. 16 illustrate a state in which the hook part 81c is held at a front use position, where the hook part 81c is located in front of the fixed cover 62. FIG. 17 and FIG. 18 illustrate a state in which the hook part 81c is held at a side use position, where the hook part 81c is located on the right side of the fixed cover 62. The hook bar 81 may be held in each of these positions as the engagement pin 81e is elastically fitted into the corresponding engagement groove. Incidentally, although not illustrated, the hook bar 81 may be held in a retracted position where the hook part 81c is positioned above the fixed cover 62, such as by rotating the hook bar 81 180 degrees from the front use position. As described above, the hook bar 81 may be held in any one of the total of four positions, in which the hook part 81c is positioned in front of, above, to the left of, or to the right of the fixed cover 62 as the engagement pin 81e is elastically fitted into the engagement grooves.

According to the hanging hook 80 of the second embodiment, the compactness of the portable cutting machine 60 can be ensured by keeping the hook bar 81 in the retracted position, thereby preventing interference when not in use. On the other hand, the portable cutting machine 60 can be suspended in various postures. For instance, the hook bar 81 can selectively be placed in the front use position or in the side use position, in accordance with the situation at the work site. Therefore, the function of the hanging hook 80 can be enhanced.

The structures of the hanging hook 50 of the first embodiment and the hanging hook 80 of the second embodiment are illustrated such that the engagement pin is elastically fitted into the engagement groove, so as to hold the various positions of the hook bars 51, 81. However, for example, it may be also possible to configure the structure so that the positions of the hook bars 51, 81 are locked by fastening the fixing screw.

In FIG. 25 to FIG. 28, a portable cutting machine 90 according to the third embodiment is shown. The portable cutting machine 90 according to the third embodiment is different from the portable cutting machine 60 according to the second embodiment in that a hanging hook 91 is provided which is different from the hanging hook 80 according to the second embodiment. The components and structures other than the hanging hook 91 are substantially the same as those of the portable cutting machine 60 of the second embodiment. Therefore, these components and structures will be described using the same reference numerals. Similar to the second embodiment, a connecting part 70 for connecting a suspending member 71, such as a tether strap, is provided at a rear part of the handle portion 23 of the portable cutting machine 90 of the third embodiment.

Figure 25:
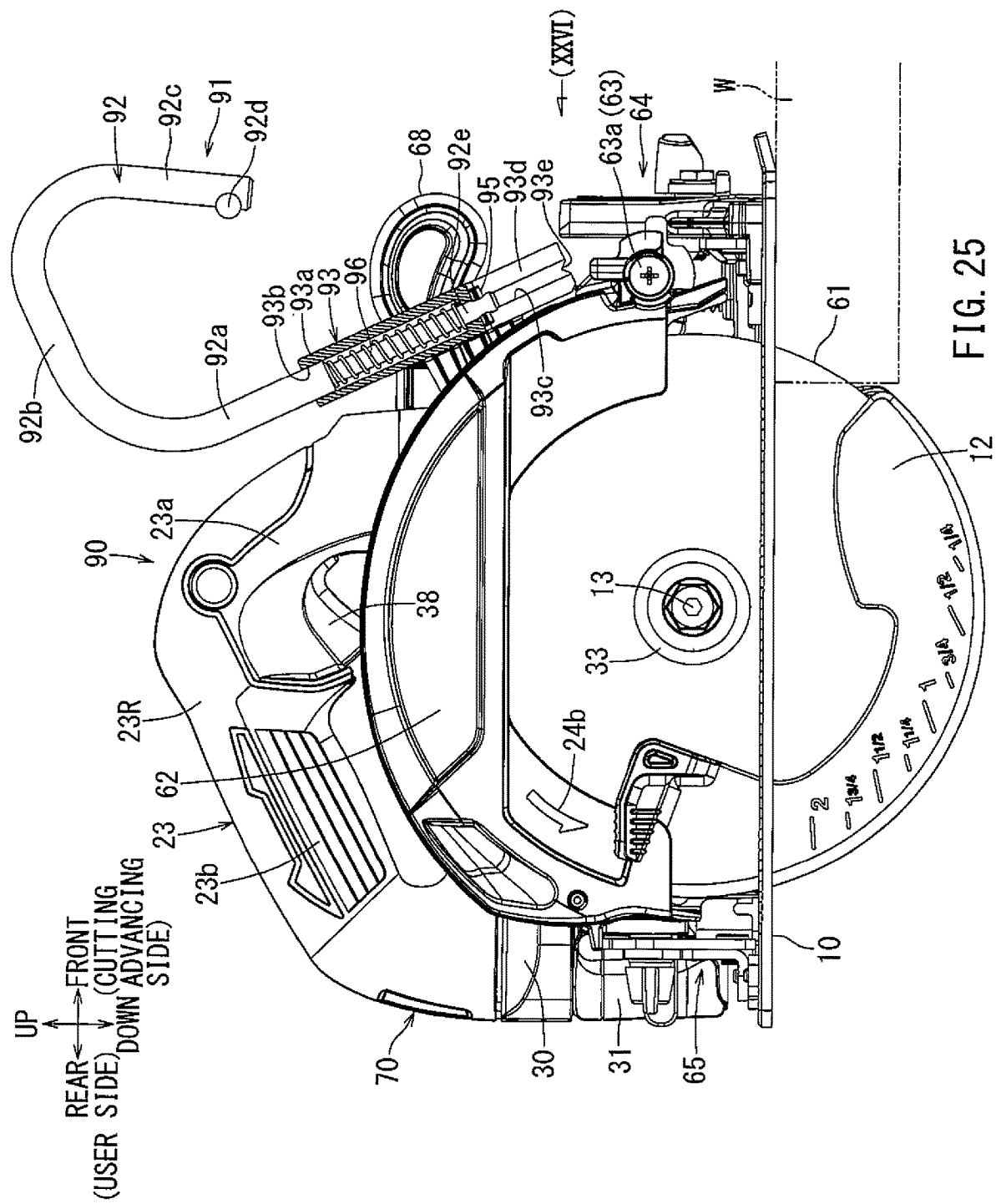
FIG. 25 is a right side view of the portable cutting machine according to the third embodiment. This figure illustrates a state in which the hook is out in a front position.

The hanging hook 91 according to the third embodiment is supported at the front part of the fixed cover 62, similarly to the second embodiment. The hanging hook 91 according to the third embodiment includes a hook bar 92 formed by bending a steel rod in a U-shape and a hook supporting portion 93 configured to support the hook bar 92 at the front part of the fixed cover 62. The hook bar 92 includes a vertical part 92a extending upward from the hook supporting portion 93, a lateral part 92b extending in substantially a perpendicular direction from the upper part of the vertical part 92a, and a hook part 92c extending downward from the tip end of the lateral part 92b at an acute angle direction. A hooking projection 92d is provided on the tip end of the hook part 92c, which is configured to be engaged with an object to be hooked, such as a scaffold. As shown in FIG. 25, the vertical part 92a is inclined in a rearward inclined direction, so that the upper part is further displaced in the rearward direction. In this regard, it is configured similar to the hanging hook 80 according to the second embodiment.

A support shaft part 92e may have a narrower diameter and be coaxially provided in the vertical part 92a of the hook bar 92. The support shaft part 92e extends from and further downward than the lower end of the vertical part 92a. The lower part of the support shaft part 92e projects from the lower end of the support tubular portion 93a. The engagement pin 95 is provided at this projecting part to project from both radial sides.

The hook support portion 93 includes a cylindrical support tubular portion 93a and an attachment portion 93f adjacent to the fixed cover 62. The attachment portion 93f is connected with two attachment screws 94, such that the hook support portion 93 is attached to the front part of the fixed cover 62. The support tubular portion 93a according to the third embodiment has a cylindrical shape, which is longer than the support tubular portion 82b according to the second embodiment. Two insertion holes with different diameters are coaxially provided on the inner peripheral side of the support tubular portion 93a according to the third embodiment. The upper insertion hole 93b is configured to have a larger diameter than that of the lower insertion hole 93c. The upper insertion hole 93b is formed to have a diameter such that the vertical part 92a of the hook bar 92 can be inserted. The lower insertion hole 93c is formed to have a diameter so that the support shaft part 92e of the hook bar 92 can be inserted, but the vertical part 92a, which has a larger diameter, cannot be inserted.

Figure 26:
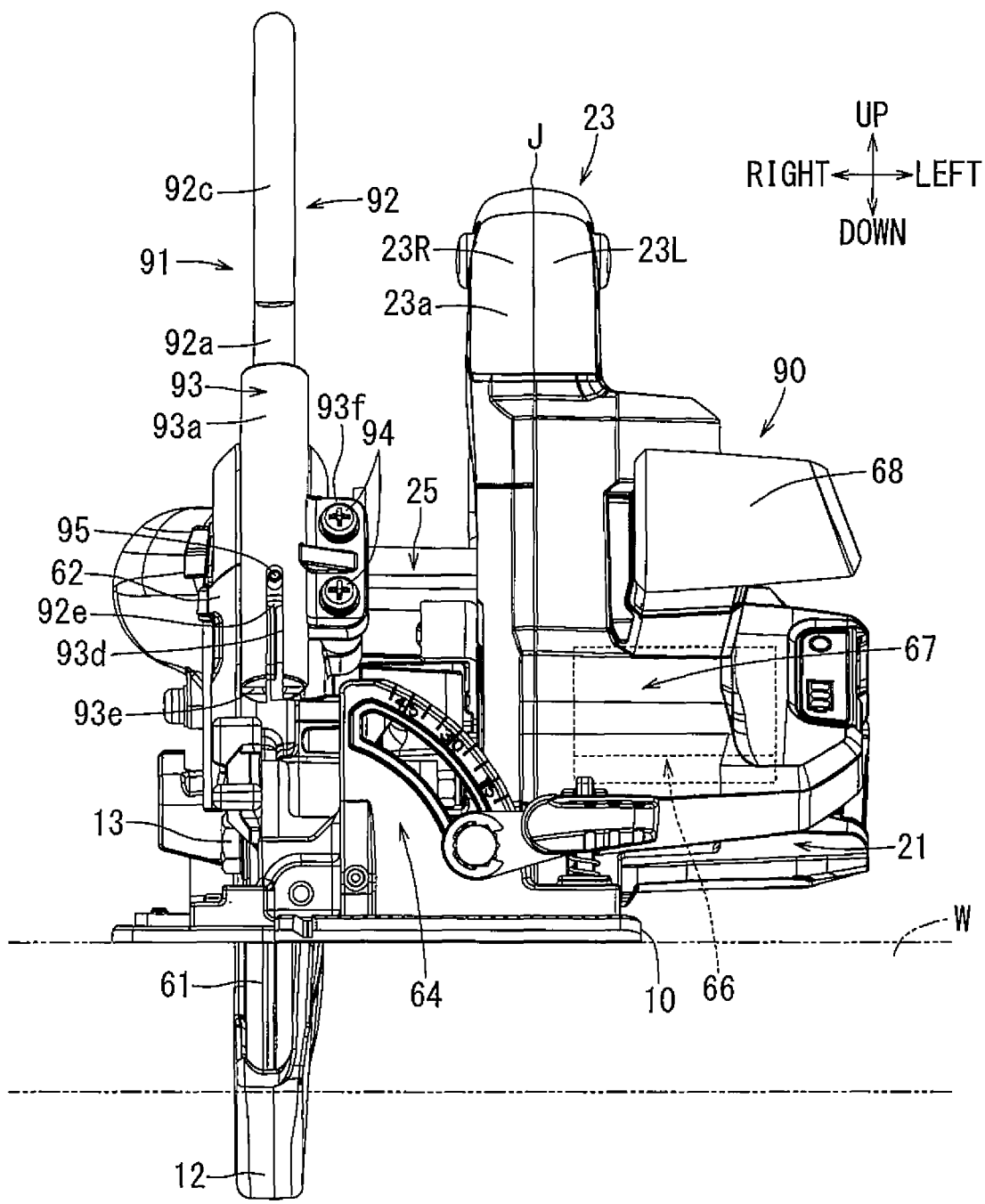
FIG. 26 is a front view of the portable cutting machine according to a third embodiment, as viewed from a direction indicated by an arrow (XXVI) in FIG. 25.

A compression spring 96 is interposed between the lower surface of the vertical part 92a and the bottom part of the insertion hole 93b. The compression spring 96 is also positioned around the support shaft part 92e of the hook bar 92. Due to the biasing force of the compression spring 96, the vertical part 92a is biased in a pulling out direction, upward from the insertion hole 93b of the support tubular portion 93a. This causes the hook bar 92 to be biased toward the upper position, in which the hook bar 92 is displaced upward. FIG. 25 and FIG. 26 illustrate a state in which the hook bar 92 is located in an upper position.

Two engagement grooves 93d, 93e having different depths in the longitudinal direction are formed in the lower surface of the support tubular part 93a. The deeper engagement groove 93d is formed deeper while the shallower engagement groove 93e is formed shallower. Each of the deeper engagement groove 93d and the shallower engagement groove 93e is formed in a radial direction, passing the center of the lower surface of the support tubular part 93a. Each of the deeper engagement groove 93d and the shallower engagement groove 93e is arranged so as to intersect to each other in a cross-shape in a bottom view of the support tubular part 93a (as viewed from the direction indicated by an arrow XXVI in FIG. 25).

As shown in FIG. 25, when the hook bar 92 is rotated about the vertical part 92a, causing the engagement pin 95 to be positioned within the deeper engagement groove 93d by the biasing force of the compression spring 93, the engagement pin 95 is held at an upper position, in which the engagement pin 95 abuts the bottom part of the engagement groove 93d. With the hook bar 92 positioned in the upper position, the lateral part 92b will be in a state in which it extends obliquely upward and frontward from the upper part of the vertical part 92a (e.g., in an upper use position), or in a state in which it extends obliquely downward and rearward (e.g., in an upper retracted position). In the upper use position, in which the lateral part 92b extends obliquely upward and forward, the hook part 92c is in a state in which the hook part 92c is positioned above the front part of the base 10. The upper use position of the hook bar 92 corresponds to the use position, which is a favorable position when the hook par 92 is to be hooked to a separate component, for example, a scaffold or the like. The lateral part 92b and the hook part 92c can be positioned above the fixed cover 62 in the upper retracted position, which is rotated from this upper use position by 180 degrees.

Figure 27:
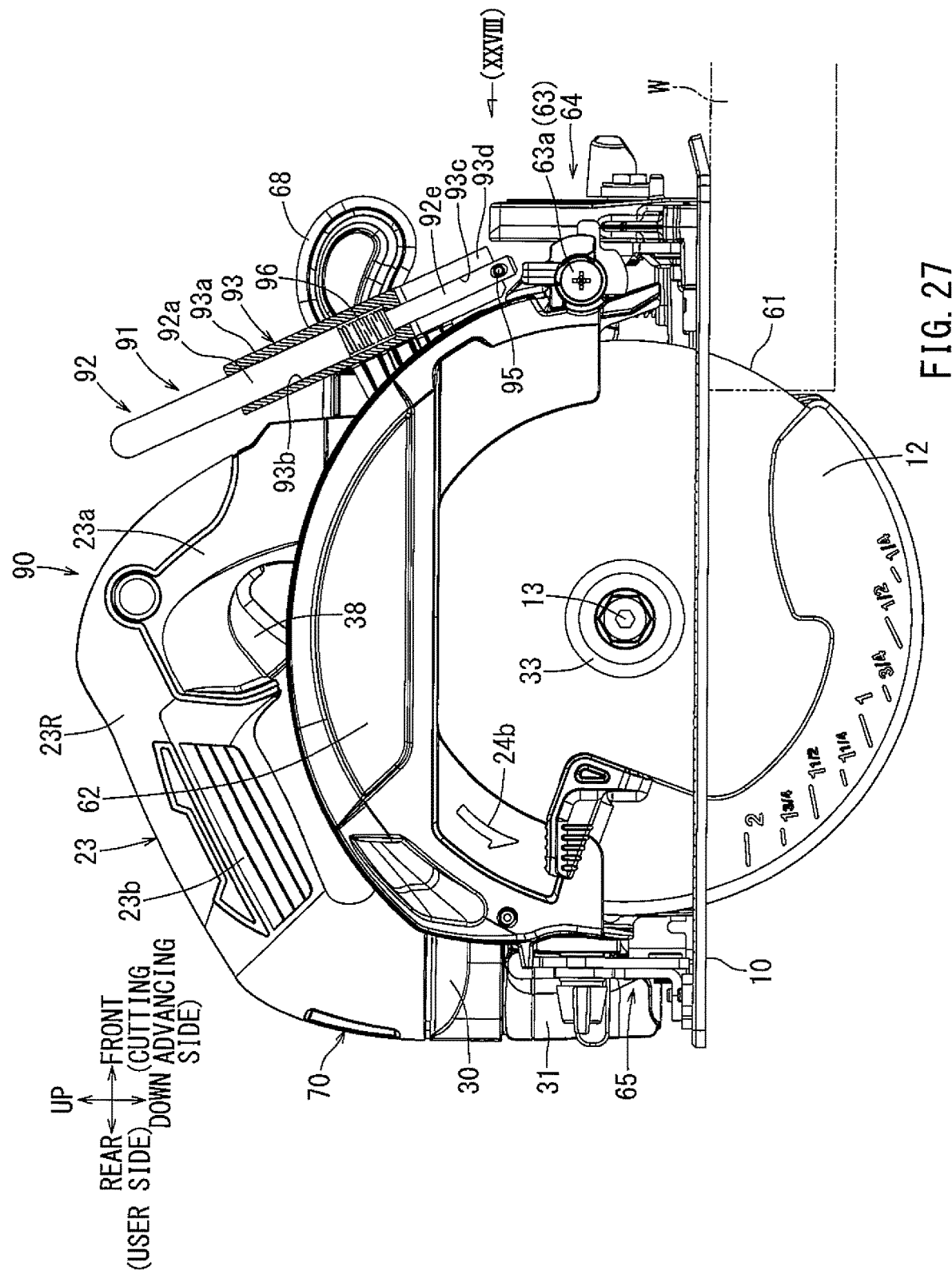
FIG. 27 is a right side view of the portable cutting machine according to the third embodiment. This figure illustrated a state in which the hook is retracted in a retracted position.
Figure 28:
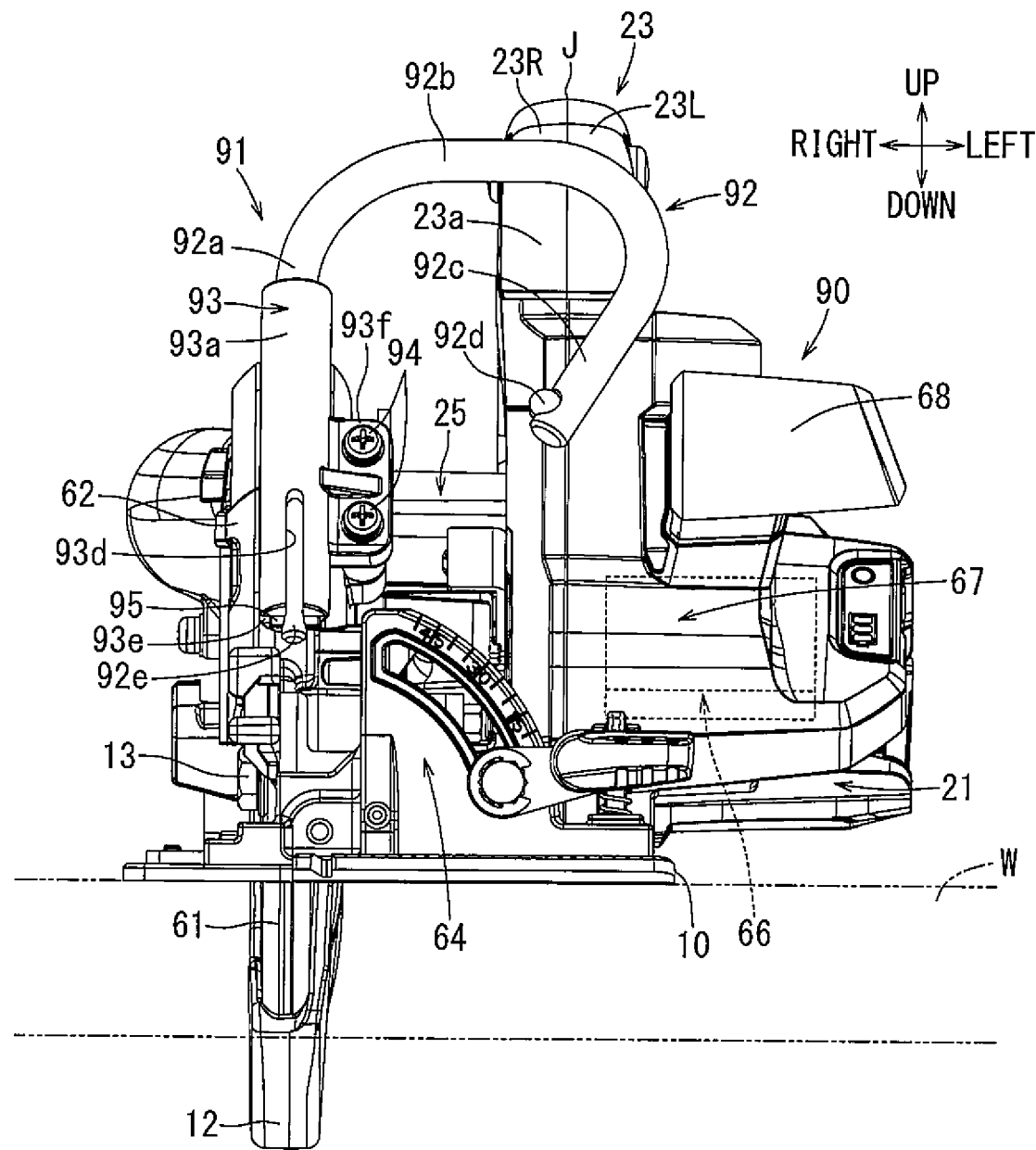
FIG. 28 is a front view of the portable cutting machine according of the third embodiment, as viewed from a direction indicated by an arrow (XXVIII) in FIG. 27.

The hook bar 92 may be pushed down from the upper position to release the engagement pin 95 from the deeper engagement groove 93d. Thereafter, the hook bar 92 is rotated about 90 degrees around the vertical part 92a, and then the pushing down operation is stopped. Thereby, the hook bar 92 slightly returns upward, such that the engagement pin 95 is fitted into the shallower engagement groove 93e. This state is illustrated in FIG. 27 and FIG. 28. When the engagement pin 95 is positioned at and fitted into the shallower engagement groove 93e, the hook bar 92 as a whole is held in a position lower than said use position. This lower position corresponds to the retracted position of the hook bar 92. As illustrated, when the hook bar 92 is retracted in the retracted position, its lateral part 92b extends from the upper part of the vertical part 92a and to the left. As a result, the hook part 92c is positioned in front of the handle portion 23. Therefore, when the hook bar 92 is retracted to the retracted position, the hook part 92c will be located in a position lower and further rearward than the use position. The compactness of the portable cutting machine 90 can be thus achieved. Because the cutting operation can be performed while the hook bar 92 is compactly retracted, the operability of the portable cutting machine 90 can be enhanced. Further, the lateral part 92b may be brought into a state in which the lateral part 92b extends to the right. The lateral part 92b may thus be positioned to the right side of the fixed cover 62 by holding the hook bar 92 in a position being rotated by 180 degrees from the retracted position shown in FIG. 27 and FIG. 28. The portable cutting machine 90 can thus be suspended by hooking the hook bar 92 to the separate component in this position.

According to the above-described portable cutting machine 1 of the first embodiment, a connecting part 40 for connecting the suspending member 41, such as a so-called tether strap or the like, is provided at the rear part of the handle portion 23. It is thus possible to prevent the portable cutting machine 1 from falling down during work, for instance when the user performs cutting operations while one end of the suspending member 41 is connected to the connecting part 40 and the other end is hooked to, for example a scaffold or a handrail.

In the first embodiment, the connecting part 40 is configured to incorporate the notification member 43. The notification member 43 is configured to notify deformation of the connecting part 40 when, for example, the connecting part 40 is damaged due to an external force. This notification member 43 serves to notify the user, etc. of the event that the connecting part 40 has been deformed due to, for example, being damaged. The user, etc. can visually observe the change in positions of the notification member 43 in order to confirm that the connecting part 40 is, for example, damaged. The user can recognize that the proper functionality of the suspending member 41 may not be reliably performed if the suspending member 41 is continuously used. Therefore, the user can repair the damage, etc. to the connecting part 40 and continuously use the suspending member 41, thereby reliably performing the falling-down prevention function. Further, by suspending the use of the portable cutting machine 1 having a damaged suspending part 40, it is possible to avoid a state in which its original function is not sufficiently performed.

Further, regarding the portable cutting machine 1 according to the first embodiment, the connecting hole 42 for connecting the suspending member 41 is provided at the rear part of the handle 23. Therefore, the operability of the portable cutting machine 1 can be maintained, without the suspending member 41 interfering with the user's grasp of the handle portion 23.

Furthermore, according to the portable cutting machine 1 of the first embodiment, the suspending member 41 is wound around the end 23c of the handle portion 23 while the suspending member 41 is inserted into the both the connecting hole 42 and the notification member 43. The suspending function of the suspending member 41 can be maintained while the suspending member 41 is connected to the rear part of the handle portion 23 via the notification member 43, even if the end 23c breaks when an external force, such an impact, etc., is applied.

Further modification may be made to the above-described embodiments. For example, in the first embodiment, a structure is illustrated in which the connecting part 40 for connecting the suspending member 41 is provided at the rear part of the handle portion 23. However, the same effect can be obtained by incorporating a similar notification member positioned at the upper part or the front part of the handle portion 23.

Further, a structure was illustrated in which the notification member 43 is incorporated, so as to extend around the connecting hole 42 and the screw fastening part 37. However, the structure may also be configured to incorporate the notification member so as to extend over a rib and a hook projection, which is provided as an alternative to the screw fastening part 37.

Further, the suspending member may be configured to be connected to components other than the handle portion 23. Even in this case, the same effect can be obtained by adopting the illustrated connecting part.

Further, in the second embodiment, although the notification member 73 was illustrated as being formed by bending a steel rod, alternatively, a ring-shaped wire material may be incorporated in a similar manner as the first embodiment.

Moreover, the notification members 43, 73 were illustrated as serving to notify of damage of the connecting part 40, 70 being displaced from the incorporated position. However, a notification means may be incorporated to notify one of the damage of the connecting part, for example, by illumination or generating sound.

What is claimed is:

1. A portable cutting machine configured to perform a cutting process, comprising:
   an electric motor configured to rotate a rotary cutting tool so as to cut a cutting material;
   a housing that includes (i) a motor housing that houses the electric motor and (ii) a handle configured to be gripped by a hand of a user of the portable cutting machine; and
   a notification piece; wherein:
   the handle includes a connecting part that is configured to receive and retain a suspending piece that is configured to be also supported by a separate component from the portable cutting machine; and
   the notification piece (i) has a first end connected to an inside of the handle by a fastener and a second end configured to be attached to the suspending piece and (ii) is configured to deform such that the second end moves outside of the handle due to force by the suspending piece to provide a notification of damage to the connecting part when the connecting part is damaged or broken.

2. The portable cutting machine as described in claim 1, wherein the connecting part and/or the notification piece includes a connecting hole that is configured to receive the suspending piece.

3. The portable cutting machine as described in claim 2, wherein the connecting part and the notification piece are configured such that the suspending piece can be inserted through an inner peripheral side of the notification piece and the connecting hole so as to be connected to the connecting part.

4. The portable cutting machine as described in claim 2, wherein
   the connecting part is configured such that the suspending piece is insertable into the connecting hole so as to be connected to the connecting part.

5. The portable cutting machine as described in claim 1, wherein the notification piece is a ring-shaped wire.

6. The portable cutting machine as described in claim 1, wherein:
   the notification piece is configured to visually indicate to a user of the portable cutting tool of damage to the connecting part by rotation or deformation of the notification piece with respect to the first end such that the second end of the notification piece moves from inside to outside the handle.

7. The portable cutting machine as described in claim 1, further comprising a base (i) having a flat plate shape and (ii) configured to contact an upper surface of the cutting material when the portable cutting machine cuts the cutting material, wherein:
   the housing includes the connecting part that extends along the rotary cutting tool; and
   the connecting part and the notification piece are at a rear part of the connecting part; and
   the rear part of the connecting part is on an opposite side of the motor from a front part of the base.

8. The portable cutting machine as described in claim 1, wherein:
   the notification piece and the connecting part are configured such that the second end of the notification piece and the connecting part receive a loop of the suspending piece that is looped around the second end and the connecting piece to affix the suspending piece to the second end and the connecting piece; and
   the first end of the notification piece is affixed to the handle by the fastener.

\* \* \* \* \*

UNITED STATES PATENT AND TRADEMARK OFFICE
CERTIFICATE OF CORRECTION

PATENT NO. : 11,684,985 B2
APPLICATION NO. : 16/969445
DATED : June 27, 2023
INVENTOR(S) : Tatsuo Nakashima et al.

It is certified that error appears in the above-identified patent and that said Letters Patent is hereby corrected as shown below:

In the Claims

Please amend Claim 7 as follows:
7. The portable cutting machine as described in claim 1, further comprising a base (i) having a flat plate shape and (ii) configured to contact an upper surface of the cutting material when the portable cutting machine cuts the cutting material, wherein:
    the housing includes a handle portion that extends along the rotary cutting tool; and
    the connecting part and the notification piece are at a rear part of handle portion and
    the rear part of the handle portion is on an opposite side of the motor from a front part
of the base.

Signed and Sealed this
Twenty-ninth Day of August, 2023

*Katherine Kelly Vidal*

Katherine Kelly Vidal
*Director of the United States Patent and Trademark Office*